(12) United States Patent
Hsu

(10) Patent No.: US 10,593,918 B2
(45) Date of Patent: Mar. 17, 2020

(54) BATTERY PACK

(71) Applicant: MOBILETRON ELECTRONICS CO., LTD., Taichung (TW)

(72) Inventor: Ming-Hung Hsu, Taichung (TW)

(73) Assignee: MOBILETRON ELECTRONICS CO., LTD., Taichung (TW)

( * ) Notice: Subject to any disclaimer, the term of this patent is extended or adjusted under 35 U.S.C. 154(b) by 19 days.

(21) Appl. No.: 15/953,031

(22) Filed: Apr. 13, 2018

(65) Prior Publication Data

US 2019/0214616 A1    Jul. 11, 2019

(30) Foreign Application Priority Data

Jan. 8, 2018  (TW) .............................. 107100673 A

(51) Int. Cl.
  *H01M 2/10*    (2006.01)
  *H01M 2/20*    (2006.01)
  (Continued)

(52) U.S. Cl.
  CPC ....... *H01M 2/1077* (2013.01); *H01M 2/1083* (2013.01); *H01M 2/206* (2013.01);
  (Continued)

(58) Field of Classification Search
  CPC .... H01M 2/1077; H01M 2/0217; H01M 2/10; H01M 2/0237; H01M 2/02; H01M 10/45; H01M 10/425; H01M 10/4207; H01M 2/1083; H01M 2010/4271; H01M 2220/20; H01M 2/08; H01M 2/1011
  See application file for complete search history.

(56) References Cited

U.S. PATENT DOCUMENTS 4,607,904 A * 8/1986 D'Alessandro ...... H01M 2/1011
                                                439/476.1
2010/0073005 A1   3/2010 Yano
(Continued)

FOREIGN PATENT DOCUMENTS

CN       105723543 A    6/2016
CN       205900658 U    1/2017
(Continued)

OTHER PUBLICATIONS

European Search Report for 18214498.0, dated Apr. 18, 2019, Total of 6 pages.
(Continued)

*Primary Examiner* — Sarah A. Slifka
(74) *Attorney, Agent, or Firm* — R. Lynette Wylie; Apex Juris, pllc.

(57) ABSTRACT

A battery pack includes a case and a plurality of batteries, wherein the case includes a first body, a second body, and a connecting frame. The first body has a first opening. The second body has a second opening which could match with the first opening. A chamber is formed between the first body and the second body. The connecting frame is connected to the second body, and has a first connecting shaft and a second connecting shaft. The first connecting shaft is adapted to be connected to the first body, and the second connecting shaft is adapted to be connected to a mounting position. The batteries are disposed side by side in the chamber.

19 Claims, 19 Drawing Sheets

(51) Int. Cl.
   *H01M 2/30* (2006.01)
   *H01M 10/42* (2006.01)
   *H01M 10/48* (2006.01)

(52) U.S. Cl.
   CPC ......... *H01M 2/307* (2013.01); *H01M 10/425* (2013.01); *H01M 10/4207* (2013.01); *H01M 10/48* (2013.01); *H01M 2010/4271* (2013.01); *H01M 2220/20* (2013.01)

(56) References Cited

U.S. PATENT DOCUMENTS

| | | | |
|---|---|---|---|
| 2012/0208053 A1 | 8/2012 | Bender | |
| 2014/0017540 A1* | 1/2014 | Miyawaki | H01M 2/1016 429/99 |
| 2016/0036105 A1* | 2/2016 | Toshioka | H01M 2/1077 429/120 |
| 2017/0256760 A1* | 9/2017 | Nietling | H01M 10/613 |

FOREIGN PATENT DOCUMENTS

| | | | |
|---|---|---|---|
| CN | 206076311 U | * | 4/2017 |
| CN | 206076311 U | | 4/2017 |
| CN | 206076324 U | | 4/2017 |
| CN | 206148499 U | | 5/2017 |
| CN | 206374544 U | | 8/2017 |
| CN | 206774598 U | | 12/2017 |
| TW | 201720009 A | | 6/2017 |

OTHER PUBLICATIONS

English Abstract for CN105723543.
English Abstract for CN205900658.
English Abstract for CN206076311.
English Abstract for CN206076324.
English Abstract for CN206148499.
English Abstract for CN206374544.
English Abstract for CN206774598.
English Abstract for TW201720009.
Examination Report for TW107100673, dated Nov. 14, 2018, Total of 5 pages.
Search Report for TW107100673, dated Nov. 14, 2018, Total of 1 page.

* cited by examiner

BATTERY PACK

BACKGROUND OF THE INVENTION

Technical Field

The present invention relates generally to a battery, and more particularly to a battery pack.

Description of Related Art

With the advantages in technology and the concept of environmental protection, the development of electric vehicles has become a trend, and the battery pack portion of the electric vehicle is particularly important. Since the rechargeable battery is limited by the technical limitation, a plurality of rechargeable batteries are often connected in parallel to achieve the desired power. Therefore, there is a need for the manufacturers to develop a conductive sheet and a battery conducting module capable of connecting rechargeable batteries, reducing the weight, enabling the miniaturization, and being received into the space occupied by the rechargeable batteries.

In recent years, the environmental protection has become a trend. Replacing the carrier driven by petrochemical fuels with electric vehicles to achieve the goal of zero pollution is one of the important trends in the future development of electric vehicles, wherein a battery pack is the main power source of the electric vehicles. Therefore, there is a need for the manufacturers to develop a battery pack which could finely protect batteries disposed therein.

BRIEF SUMMARY OF THE INVENTION

In view of the above, the primary objective of the present invention is to provide a battery pack, which could effectively protect a plurality of batteries disposed therein.

The present invention provides a battery pack, which includes a case and a plurality of batteries, wherein the case includes a first body, a second body, and a connecting frame. The first body has a first opening. The second body has a second opening which could match with the first opening, and a chamber is formed between the first body and the second body. The connecting frame is connected to the second body, and has a first connecting shaft and a second connecting shaft, wherein the first connecting shaft is adapted to be connected to the first body, and the second connecting shaft is adapted to be connected to a mounting position. The batteries are disposed side by side in the chamber.

With the case structure, the batteries disposed in the battery pack could be effectively protected.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
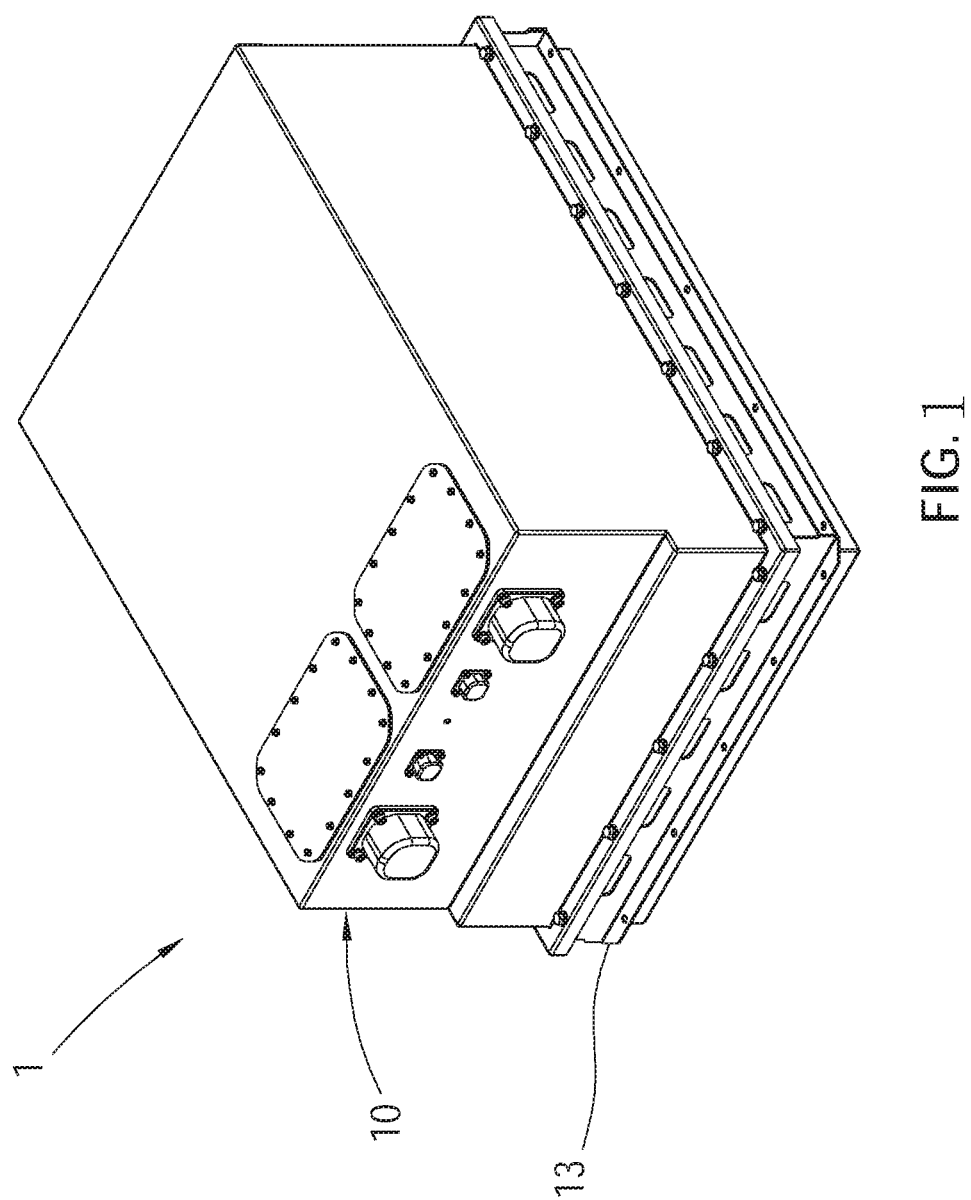
FIG. 1 is a perspective view of the battery pack of an embodiment according to the present invention.
Figure 2:
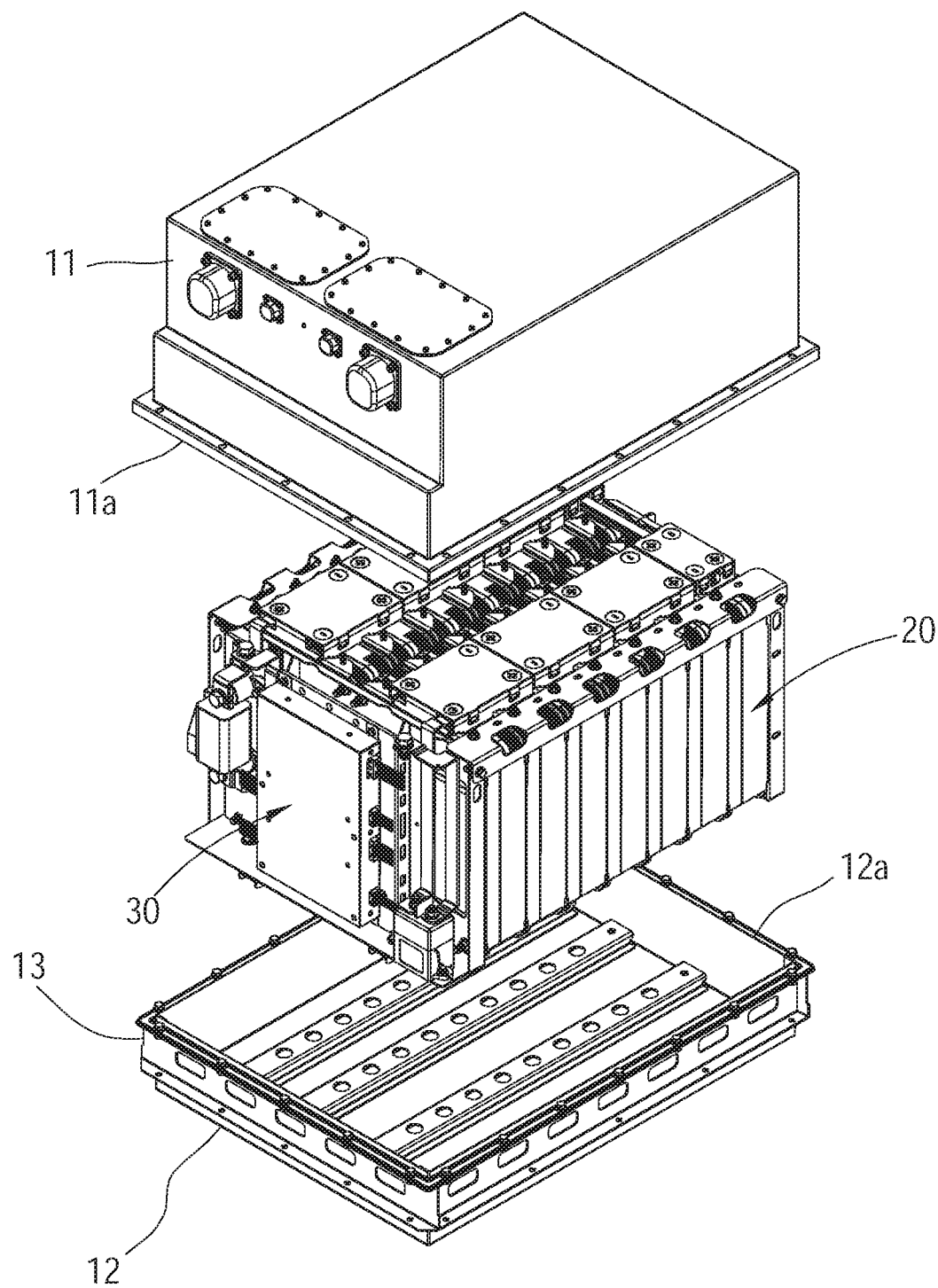
FIG. 2 is an exploded perspective view of the battery pack of FIG. 1.
Figure 3:
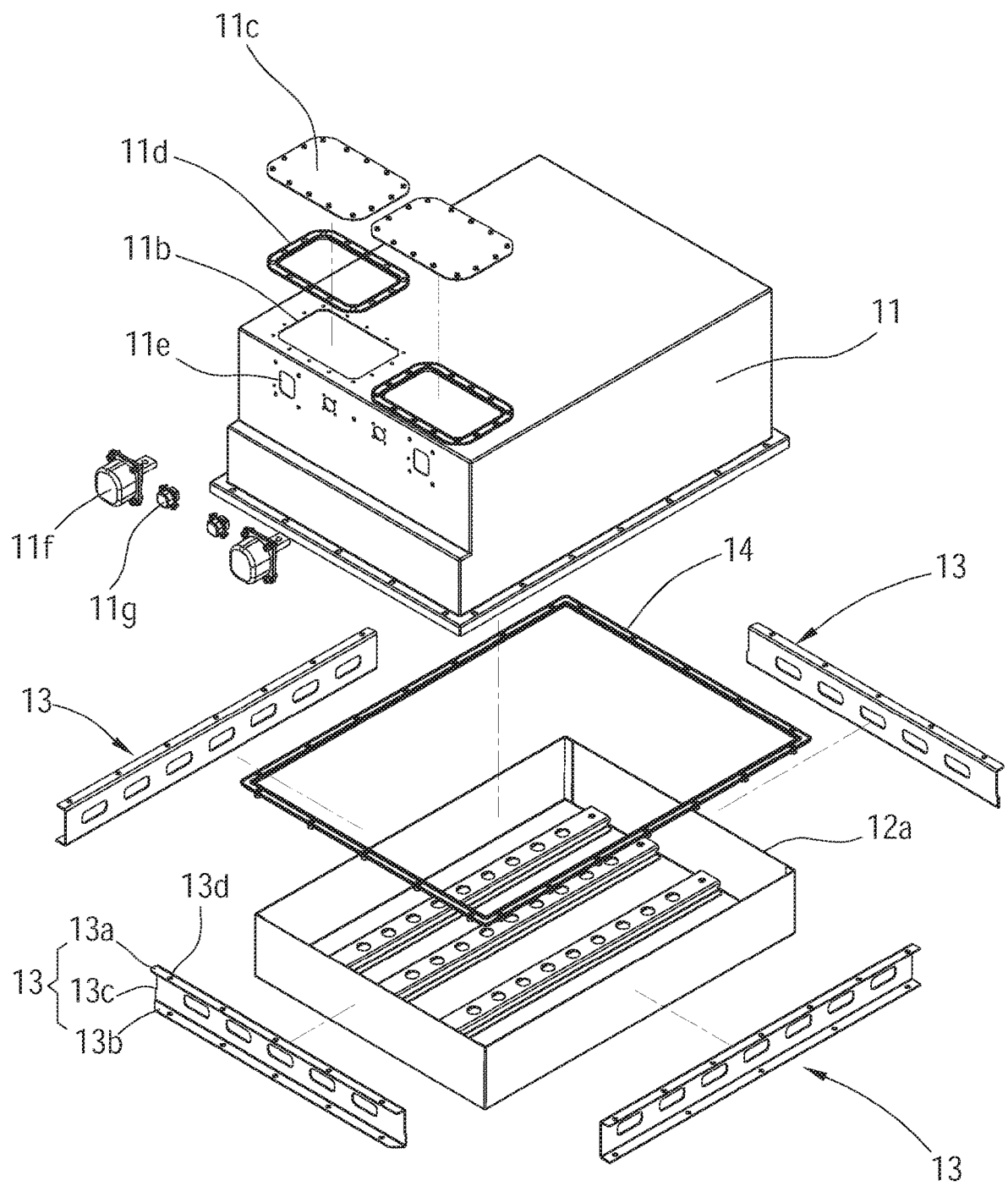
FIG. 3 is an exploded perspective view of the case of the battery pack according to the embodiment of FIG. 1.

A battery pack 1 of an embodiment according to the present invention is illustrated in FIG. 1 to FIG. 3, wherein the battery pack 1 includes a case 10 and a plurality of batteries 20.

The case 10 includes a first body 11, a second body 12, and a connecting frame 13, wherein the first body 11 has a first opening 11a, and the second body 12 has a second opening 12a which could match with the first opening 11a. A chamber is formed between the first body 11 and the second body 12, wherein the chamber is adapted to receive the plurality of batteries 20. The connecting frame 13 is connected to the second body 12.

In the current embodiment, two perforations 11b and two cover plates 11c are disposed on a top portion of the first body 11, wherein the two perforations 11b communicates with the chamber and allow a user to observe the condition of the batteries 20 disposed inside the case 10 via the perforations 11b. The two cover plates 11c are disposed on the two perforations 11b to seal the perforations 11b. In addition, an O-ring 11d can be further disposed between each of the cover plates 11c and the corresponding perforations 11b, so as to enhance a sealing performance, facilitating to prevent the batteries 20 from being polluted by foreign matters. Furthermore, a plurality of mounting holes 11e are disposed on a side surface of the first body 11, wherein the mounting holes 11e are adapted for the installation of components such as terminals 11f, transmission ports 11g, etc. In the current embodiment, the terminals 11f are adapted to be electrically connected to terminals of the plurality of batteries 20 disposed inside the case 10, and the transmission ports 11g are adapted to be connected to a monitoring device 30 for monitoring a battery assembly which is disposed inside the battery pack 1, so that the monitoring device 30 could perform signal transmission with an external device. However, the terminals and transmission ports which are disposed on the mounting holes are not a limitation of the present invention.

In the current embodiment, the case 10 includes four connecting frames 13 disposed around an outer contour of the second body 12. In order to illustrate easily, we will only describe the details of one of the connecting frames 13 in the following paragraphs, for the connecting frames 13 have substantially the same configurations, except for the length thereof. The connecting frame 13 has a first connecting shaft 13a, a second connecting shaft 13b, and a connecting plate 13c, wherein the connecting plate 13c is adapted to be engaged with the second body 12, and the first connecting shaft 13a and the second connecting shaft 13b are respectively connected to two lateral sides of the connecting plate 13c. In the current embodiment, both of the first connecting shaft 13a and the second connecting shaft 13b extend in the same direction from the two lateral sides of the connecting plate 13c. The first connecting shaft 13a is adapted to be connected to the first body 11, and the second connecting shaft 13b is adapted to be connected to a mounting position, wherein the mounting position could be a base, a supporting frame, a fixing frame, or a frame of an electric car. However, the mounting position is not a limitation of the present invention. Preferably, the first connecting shaft 13a, the second connecting shaft 13b, and the connecting plate 13c are integrally formed as a monolithic unit, whereby a stress could be divided averagely so as to provide a better support strength. However, the connecting frame is not limited to be four separate connecting frames, but could be a closed frame structure which is integrally formed as a monolithic unit in other embodiments.

Figure 4:
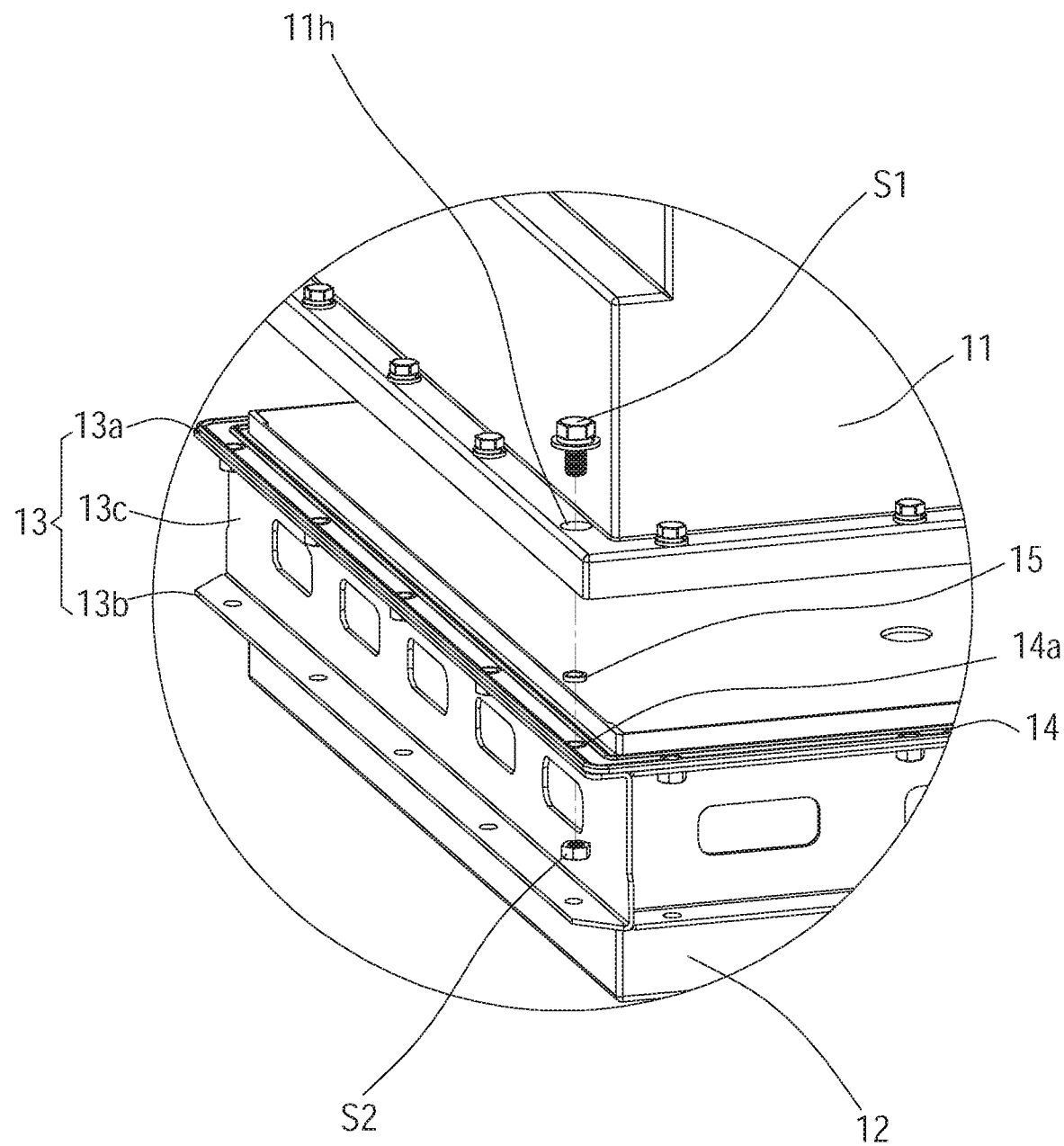
FIG. 4 is a partially exploded perspective view, showing the case of the battery pack according to the embodiment of FIG. 1.
Figure 5:
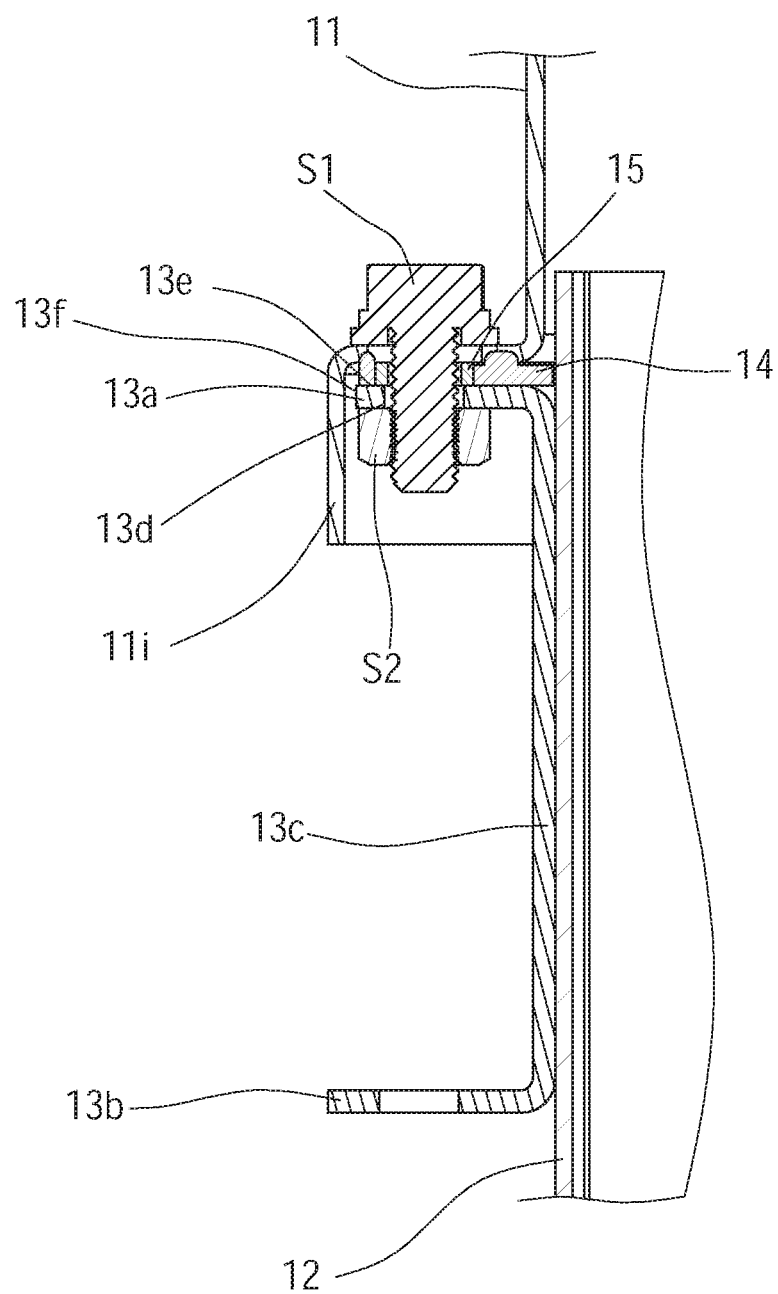
FIG. 5 is a partially sectional view, showing the assembled case of the battery pack according to the embodiment of FIG. 1.

As shown in FIG. 3 to FIG. 5, in the current embodiment, the first connecting shaft 13a is provided with a plurality of perforations 13d spaced from each other by a distance. A peripheral edge of the first opening 11a of the first body 11 is provided with a plurality of perforations 11h spaced from each other by a distance. A rubber strip 14 is disposed between the first connecting shaft 13a and the peripheral edge of the first opening 11a of the first body 11, and is disposed on an abutting surface 13e of the first connecting shaft 13a, wherein the abutting surface 13e does not face the second connecting shaft 13b. A plurality of perforations 14a spaced from each other by a distance are disposed on the rubber strip 14, and an O-ring 15 which is made of a hard material is provided within each of the perforations 14a of the rubber strip 14, so that when a connecting member which is a bolt S1 as an example sequentially passes through the perforations 11h on the peripheral edge of the first body 11, the O-ring 15, the perforations 14a of the rubber strip 14, and the perforations 13d of the first connecting shaft 13a to be engaged with a connecting member which is a nut S2 as an example, the peripheral edge of the first body 11 could indirectly abut against the abutting surface 13e of the first connecting shaft 13a via the rubber strip 14, and two ends of the O-ring 15 could respectively abut against the peripheral edge of the first body 11 and the first connecting shaft 13a. In this way, the rubber strip 14 could be prevented from being over-pressed to generate deformation, which may cause the problem of leakage. Preferably, a closed peripheral wall 11i is formed on the peripheral edge of the first body 11, wherein the closed peripheral wall 11i surrounds a side surface 13f of the first connecting shaft 13a which is connected to the abutting surface 13e. In this way, a junction of the first body 11 and the second body 12 could be prevented from being polluted by foreign matters or being splashed by liquids, providing a better sealing performance and a better protection.

Figure 6:
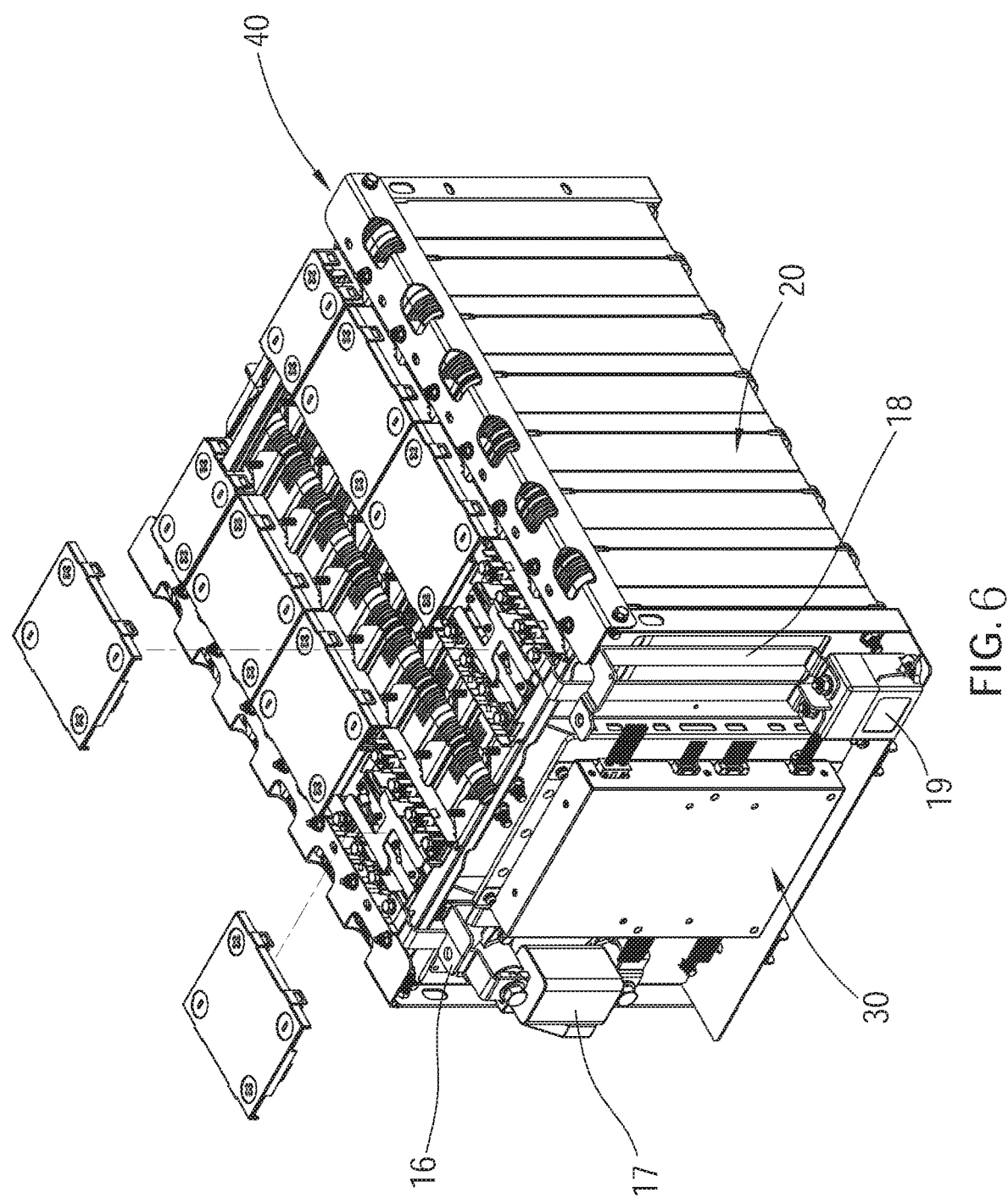
FIG. 6 is a perspective view, showing the inside of the battery pack of the embodiment of FIG. 1.
Figure 7:
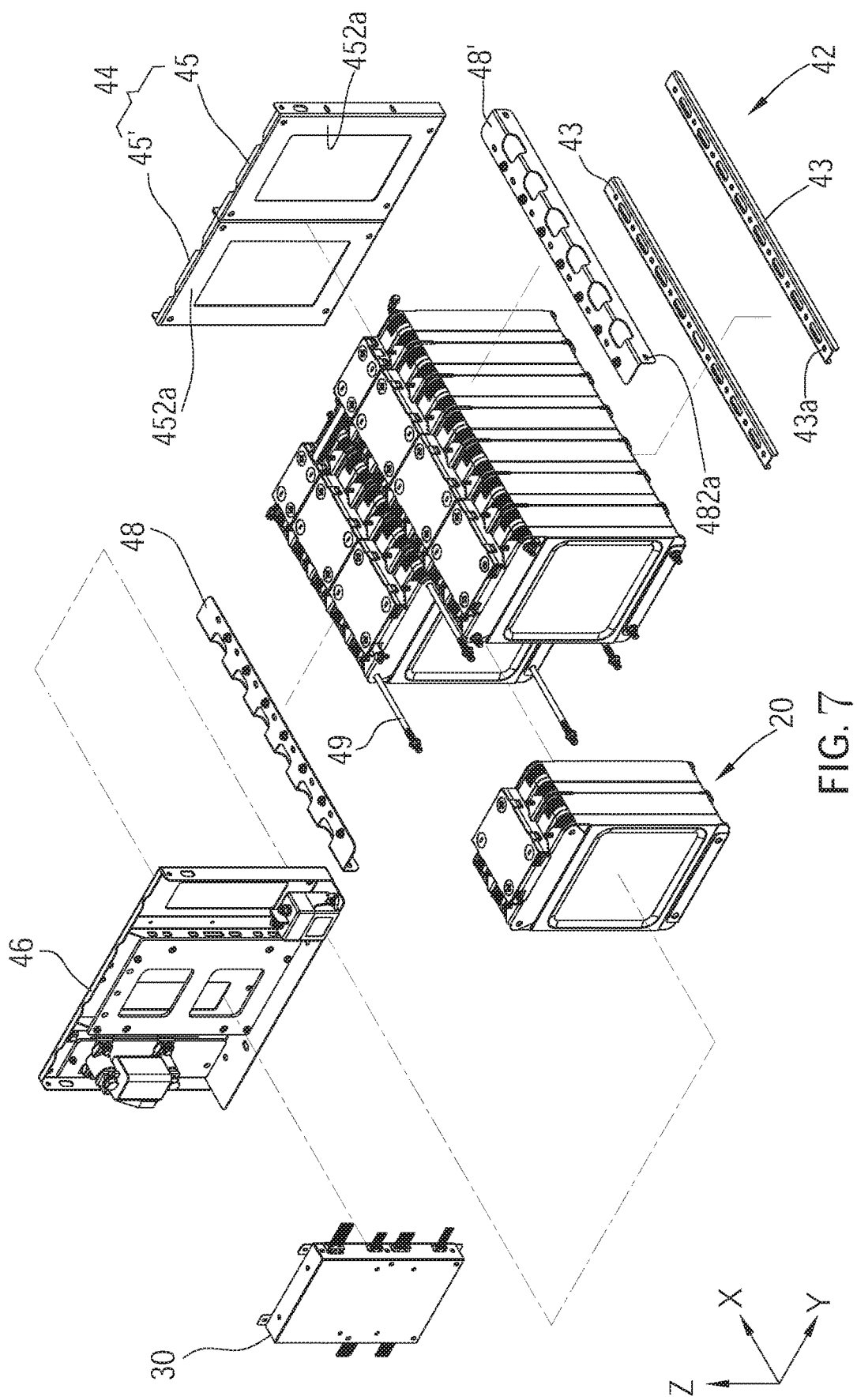
FIG. 7 and FIG. 8 are exploded perspective views of FIG. 6.
Figure 8:
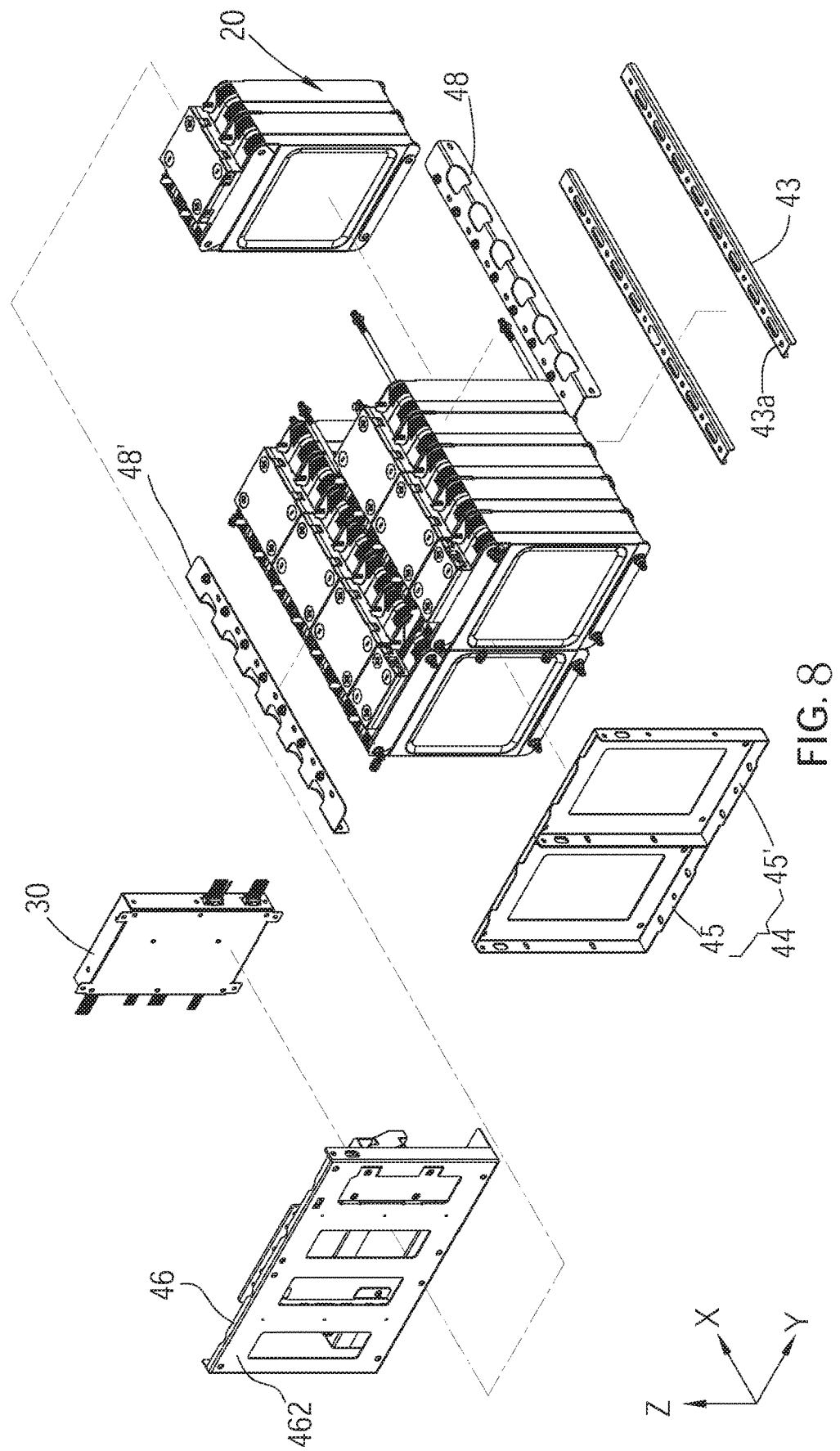

In order to illustrate easily, three axial directions, which are perpendicular to one another, are defined, wherein the three axial directions include a first axial direction which is defined as a predetermined axial direction X of the present invention, a second axial direction Y, and a third axial direction Z. As shown in FIG. 6 to FIG. 8, in the current embodiment, the plurality of batteries 20 are arranged along the predetermined axial direction X. The battery pack 1 further includes a battery holder 40 for fixing the batteries 20. The monitoring device 30 is disposed on the battery holder 40, and is electrically connected to the batteries 20, and is located on a side of the batteries 20 in the predetermined axial direction X, and is located within a projection area of the batteries 20 along the predetermined axial direction X. With the aforementioned arrangement of the monitoring device 30 and the batteries 20, the space of the case 10 could be effectively used. In addition, as shown in FIG. 3 and FIG. 6, the terminal 11f disposed on the first body 11 is electrically connected to the terminals of one of two rows of the batteries 20 via a conductive sheet 16, wherein a fuse 17 could be electrically connected between the conductive sheet 16 and the terminals of the row of batteries 20. However, the fuse is not a limitation of the present invention. Another terminal 11f disposed on the first body 11 is electrically connected to the terminals of another row of batteries 20 via a conductive sheet 18, wherein a switching device which is a relay 19 as an example could be electrically connected between the conductive sheet 18 and the terminals of the another row of batteries 20, whereby to control the conduction between the conductive sheet 18 and the terminals of the another row of batteries 20.

As shown in FIG. 6 to FIG. 11, the battery holder 40 includes a bottom frame 42, a first lateral frame 44, and a second lateral frame 46, wherein the bottom frame 42 includes two supporting bars 43 for supporting the batteries 20, wherein the two supporting bars 43 are respectively disposed below the two rows of battery assemblies formed by arranging the batteries 20 side by side. Each of the supporting bars 43 extends along the predetermined axial direction X. An end of each of the supporting bars 43 has a first through hole 43a.

Figure 9:
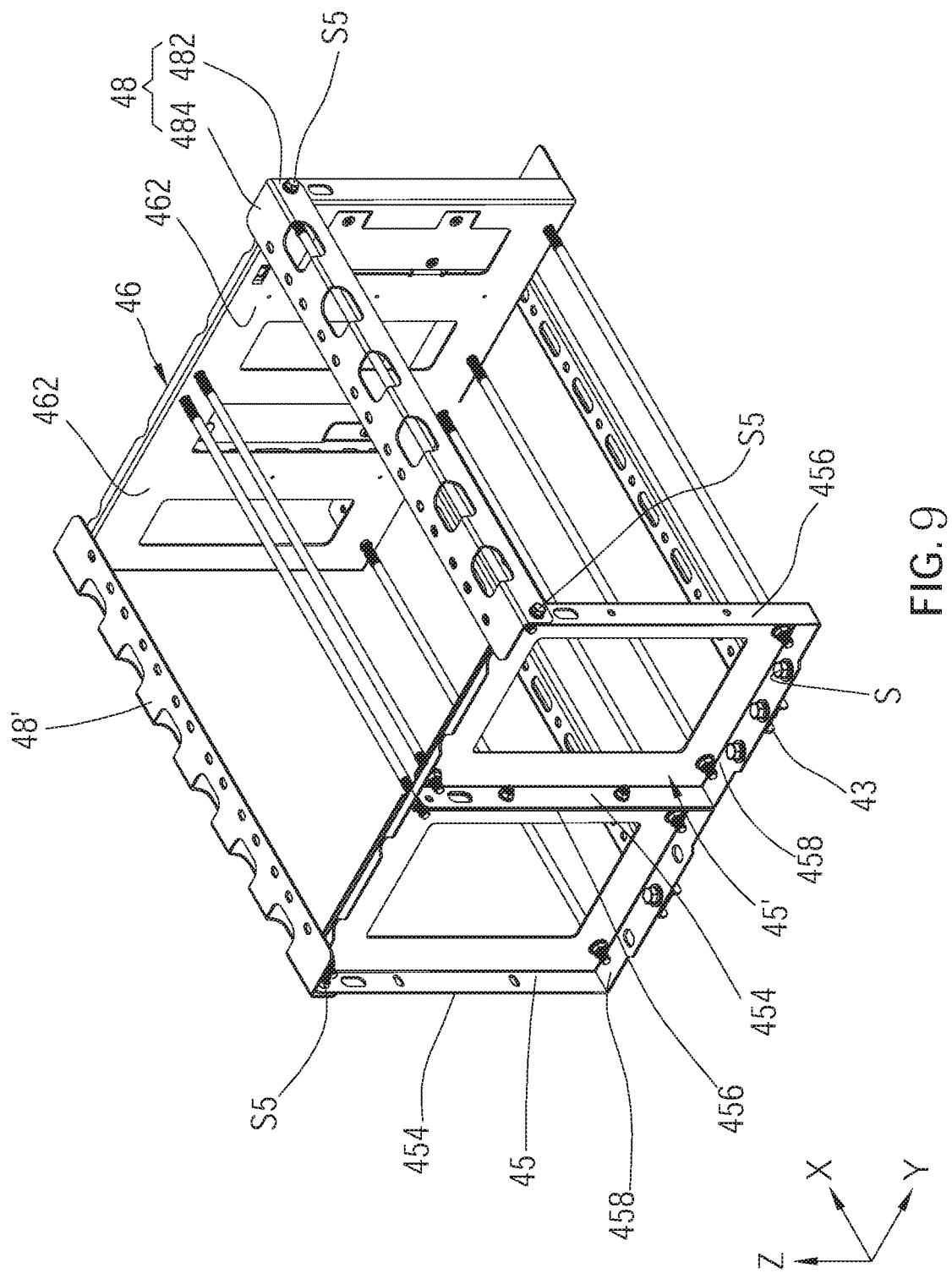
FIG. 9 is a perspective view, showing the battery holder of the battery pack according to the embodiment of FIG. 1.
Figure 10:
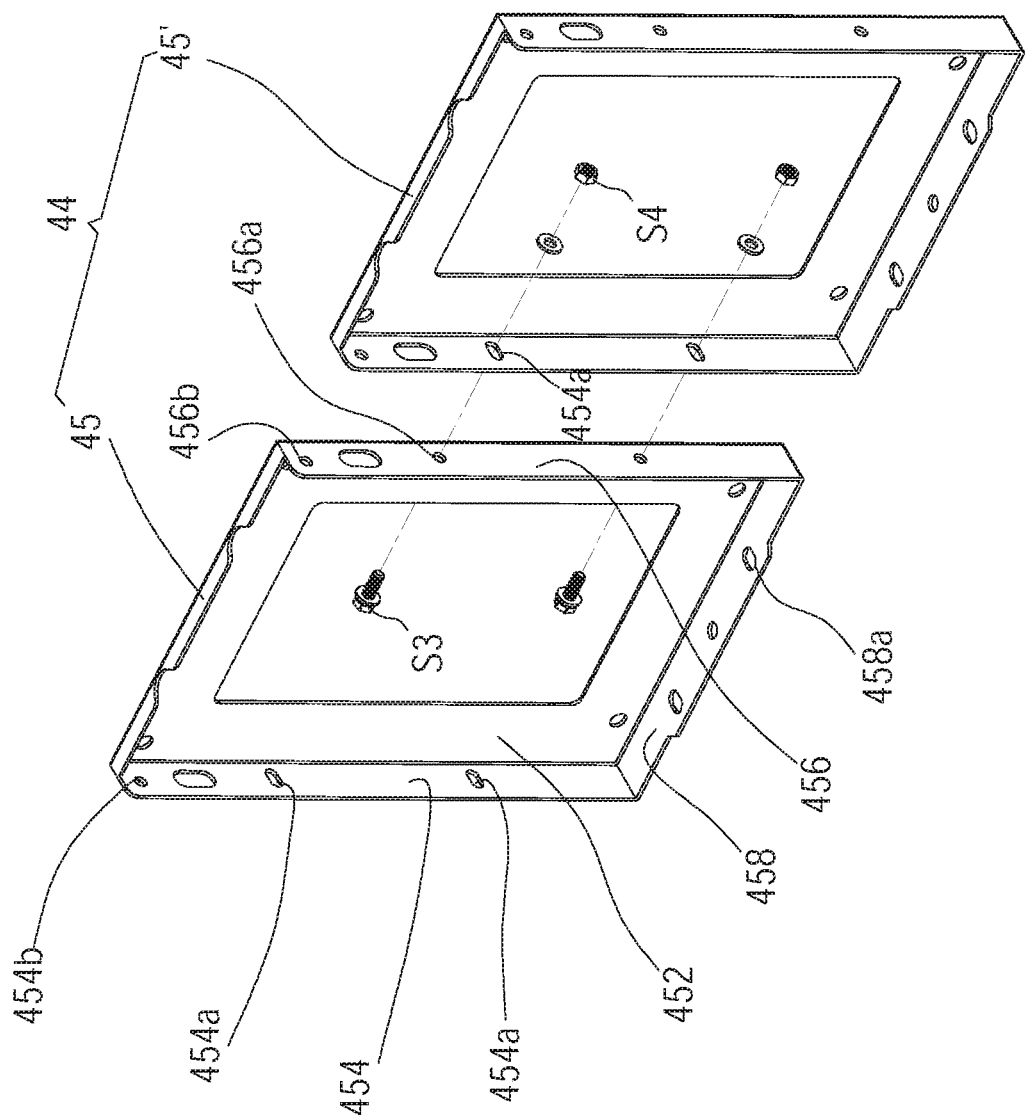
FIG. 10 is a perspective view, showing the first lateral frame of the battery holder of the battery pack according to the embodiment of FIG. 1.

The first lateral frame 44 includes two side frames 45, 45', wherein the two side frames 45, 45' have the same structure, in order to illustrate easily, one of the side frames 45, 45' is used for illustration. As shown in FIG. 9 and FIG. 10, the side frame 45 includes a main plate 452, a first side bar 454, and a second side bar 456, wherein the main plate 452 is disposed perpendicular to the predetermined axial direction X, and has a first blocking surface 452a (as shown in FIG.

7) facing one row of the batteries 20. The first side bar 454 and the second side bar 456 are respectively connected to two opposite sides of the main plate 452. The first side bar 454 and the second side bar 456 extend along the same axial direction (i.e., the third axial direction Z). The first side bar 454 has two first perforations 454a, and the second side bar 456 has two second perforations 456a corresponding to the first perforations 454a. Each of the first perforations 454a of the first side bar 454 has a first width in the predetermined axial direction X, and each of the second perforations 456a of the second side bar 456 has a second width in the predetermined axial direction X, wherein the first width is greater than the second width. Preferably, a height of each of the first perforations 454a and a height of each of the second perforations 456a in the third axial direction Z are the same. In the current embodiment, each of the second perforations 456a is a circular hole, and each of the first perforations 454a is long in shape, wherein a longitudinal axis direction of each of the first perforations 454a is parallel to the predetermined axial direction X. In addition, the side frame 45 further includes a bottom bar 458 connected to a bottom of the main plate 452, wherein the bottom bar 458 has a plurality of third perforations 458a arranged along the second axial direction Y. However, the number of the first perforation, the number of the second perforation, and the number of the third perforation are not a limitation of the present invention. In practice, the side frame 45 could be disposed with only one first perforation, one second perforation, and one third perforation.

Also, the first side bar 454 further has a fourth perforation 454b, and the second side bar 456 further has a fifth perforation 456b. In the current embodiment, both of the fourth perforations 454b and the fifth perforations 456b are circular holes. The fourth perforations 454b are disposed approach to a top edge of the first side bars 454, and the fifth perforations 456b are disposed approach to a top edge of the second side bars 456.

The side frames 45, 45' are adjacent to each other and are disposed on the bottom frame 42, wherein the second side bar 456 of one of the side frames 45, 45' (i.e. the side frame 45) is adjacent to the first side bar 454 of another side frame 45'. An engaging member, which is a bolt S3 and a nut S4 as an example, is adapted to fix the two side frames 45, 45' by passing through the second perforations 456a of the second side bar 456 of the side frame 45 and the first perforations 454a of the first side bar 454 of the another side frame 45'.

Preferably, each of the side frames 45, 45' could be respectively engaged with each of the supporting bars 43 of the bottom frame 42 along the predetermined axial direction X. In the current embodiment, a width of each of the third perforations 458a in the predetermined axial direction X is greater than a width of each of the first through holes 43a in the predetermined axial direction X, wherein each of the third perforations 458a is long in shape, and each of the first through holes 43a is a circular hole. A longitudinal axis direction of the third perforations 458a is parallel to the predetermined axial direction X. An engaging member S which is a bolt and a nut as an example passes through each of the third perforations 458a and the corresponding first through hole 43a, whereby to fix each of the bottom bars 458 and each of the supporting bars 43 of the bottom frame 42.

The second lateral frame 46 is engaged with the bottom frame 42, and is spaced from the first lateral frame 44 by a distance in the predetermined axial direction X. The second lateral frame 46 has two second blocking surfaces 462, wherein each of the second blocking surfaces 462 respectively faces the first blocking surface 452a of the main plate 452 of one of the side frames 45, 45'. Each of the batteries 20 is located between one of the first blocking surfaces 452a and the second blocking surfaces 462 which face each other. By disposing the first blocking surfaces 452a and the second blocking surfaces 462 on two lateral sides of the battery assemblies formed by the batteries 20, the battery assemblies could be held and fixed. In the current embodiment, the second lateral frame 46 is a single frame, and the two second blocking surfaces 462 are located on the same surface of the single frame. In practice, the second lateral frame 46 could include two frames with the same structures, just like the side frames 45, 45', and the two frames of the second lateral frame 46 could be engaged in the same way with the first lateral frame 44. Also, the second lateral frame 46 could be engaged with the supporting bars 43 in the same way with the first lateral frame 44 engaged with the supporting bars 43.

Figure 11:
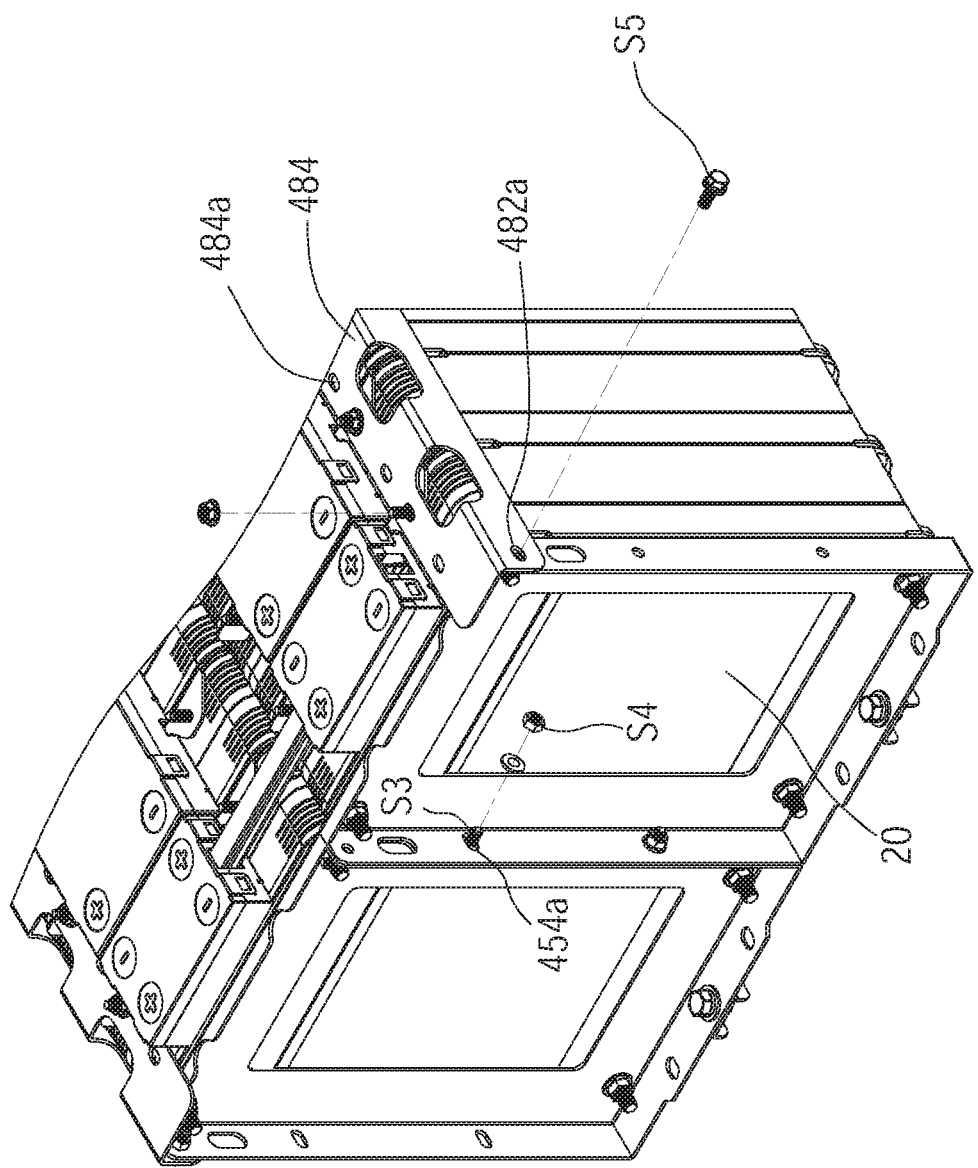
FIG. 11 is a perspective view, showing the battery holder is assembled with the battery assembly, and how the side bars and the first lateral frame are assembled.

In the current embodiment, the battery holder 40 further includes two side bars 48, 48', which have the same structures. As shown in FIG. 9, one of the side bars 48, 48' is used for illustration, wherein the side bar 48 includes a side plate 482 and a top plate 484. An end of the side plate 482 has a second through hole 482a (as shown in FIG. 11) which is adapted to be engaged with the first lateral frame 44, while another end thereof also has a second through hole 482a which is adapted to be engaged with the second lateral frame 46. A width of each of the second through holes 482a in the predetermined axial direction X is greater than both of a width of each of the fourth perforations 454b and a width of each of the fifth perforations 456b in the predetermined axial direction X. The top plate 484 is connected to a top side of the side plate 482 and is perpendicular to the side plate 482. The top plate 484 has a plurality of holes 484a spaced from one another by a distance in the predetermined axial direction X, wherein the holes 484a of the top plate 484 are long in shape, and a longitudinal axis direction of each of the holes 484a of the top plate 484 is parallel to the predetermined axial direction X. As shown in FIG. 11, the holes 484a of the top plate 484 are adapted to be passed through by a positioning member disposed between the batteries 20, whereby the top plate 484 is engaged with the positioning member via an engaging member, so as to position the batteries 20. In practice, the side bars 48 could be omitted.

An engaging member S5, which is a bolt and a nut as an example, passes through the fourth perforation 454b and the second through hole 482a which are corresponding to each other, whereby to fix an end of the side plate 482 of one of the side bars 48' to the first side bar 454 of the side frame 45 (i.e., the first side bar 454 which is not adjacent to the another side frame 45'). Another engaging member S5, which is a bolt and a nut as an example, passes through the fifth perforation 456b and the second through hole 482a which are corresponding to each other, whereby to fix an end of the side plate 482 of another side bar 48 to the second side bar 456 of the another side frame 45' (i.e., the second side bar 456 which is not adjacent to the another side frame 45). An engaging member S5, which is a bolt and a nut as an example, passes through the second through hole 482a of another end of the side plate 482 and the second lateral frame 46, whereby the another end of the side plate 482 of each of the side bars 48, 48' is respectively engaged with one of two opposite sides of the second lateral frame 46 and fixed.

In the current embodiment, the battery holder 40 is disposed with a plurality of connecting shafts 49 (as shown in FIG. 7) which are located between the first lateral frame 44 and the second lateral frame 46, wherein the connecting shafts 49 are adapted to connect the batteries 20 and are connected to the first lateral frame 44 and the second lateral frame 46. In the current embodiment, the connecting shafts 49 are through bolts as an example, and each of the batteries 20 has a plurality of perforations to be passed through by the connecting shafts 49, which not only facilitates alignment assembling process, but also could be in conjunction with nuts, so that two ends of the connecting shafts 49 are screwed to the first lateral frame 44 and the second lateral frame 46, whereby to position the batteries 20 via the connecting shafts 49, the first lateral frame 44, and the second lateral frame 46.

When there is a plurality of batteries 20, a dimension tolerance between the batteries 20 may cause the total length of each of the rows of the batteries 20 in the predetermined axial direction X to be different. With the battery holder 40 structures, the position of the side frames 45, 45' could be finely adjusted to maintain the total length of each row of the batteries 20 in the predetermined axial direction X.

Figure 12:
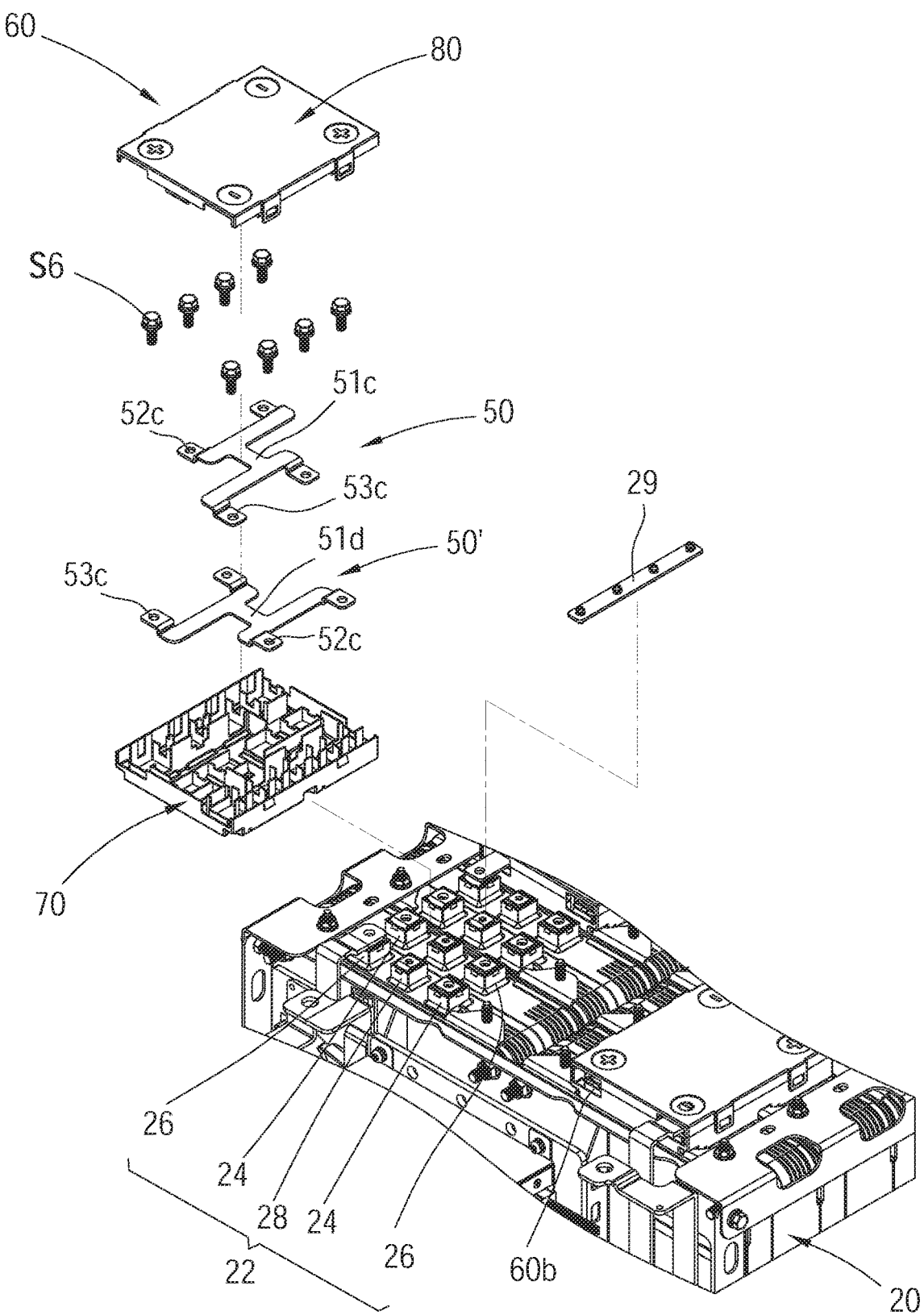
FIG. 12 is an exploded perspective view, showing the insulating casing and the battery conductive sheets of the battery pack according to the embodiment of FIG. 1.

As shown in FIG. 12, in the current embodiment, each of the plurality of batteries 20 has a plurality of terminals 22, wherein each of the terminals 22 includes a first electrode 24 and a second electrode 26. In the current embodiment, the first electrode 24 is a negative electrode and the second electrode 26 is a positive electrode. However, the first electrode 24 is not limited to be negative electrode as exemplified above, but could be positive, and the second electrode 26 is not limited to be positive electrode as exemplified above, but could be a negative electrode. In addition, a third electrode 28 is disposed between the first electrode 24 and the second electrode 26 of each of the batteries 20 to be connected to the monitoring device 30, whereby to measure the state of the batteries 20. Furthermore, in the current embodiment, the battery pack 1 includes four batteries juxtaposed to form the battery assembly, wherein the third electrodes 28 of each of the batteries 20 are electrically connected to one another via a conductive sheet 29.

In the current embodiment, the battery pack 1 further includes a plurality of battery conductive sheets 50, 50' and a plurality of insulating casings 60, wherein the battery conductive sheets 50, 50' are arranged in pairs and are disposed on the batteries 20, whereby the first electrodes 24 of the battery assembly could be electrically connected to one another, and the second electrodes 26 of the battery assembly could be electrically connected to one another. The insulating casings 60 are adapted to insulate the terminals 22 from the battery conductive sheets 50, 50'. The conductive sheet 29 is disposed between the battery conductive sheets 50, 50'.

Figure 13:
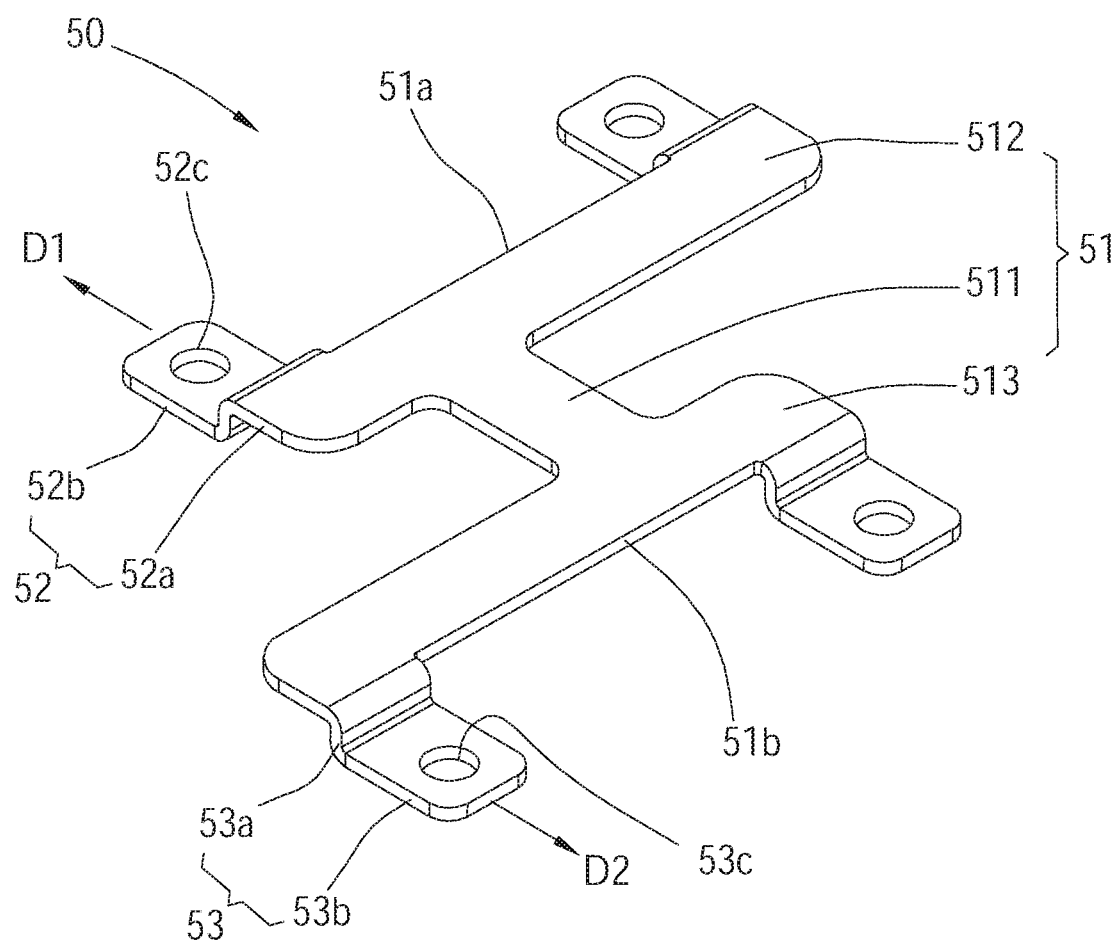
FIG. 13 is a perspective view of the battery conductive sheets of the battery pack according to the embodiment of FIG. 1.
Figure 14:
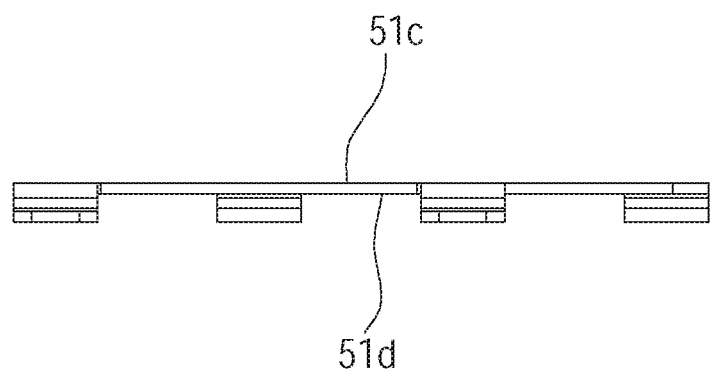
FIG. 14 is a side view of the battery conductive sheets of the battery pack according to the embodiment of FIG. 1.

For ease of explanation, we will only describe the details of one of the battery conductive sheets 50, 50' in the following paragraphs, for the battery conductive sheets 50, 50' have substantially the same configurations. As shown in FIG. 12 to FIG. 14, the battery conductive sheet 50 is made of conductive material, such as gold, silver, copper, aluminum, etc. In the current embodiment, the battery conductive sheet 50 is made of copper. However, the material of the battery conductive sheet is not a limitation of the present invention. The battery conductive sheet 50 includes a connecting portion 51, two first conducting portions 52, and two second conducting portions 53.

The connecting portion 51 has a first side 51a, a second side 51b, a first surface 51c, and a second surface 51d, wherein the first side 51a is opposite to the second side 51b, and the first surface 51c and the second surface 51d face opposite directions. The first surface 51c and the second surface 51d are disposed between the first side 51a and the second side 51b. In the current embodiment, the connecting portion 51 includes a main portion 511, a first attached portion 512, and a second attached portion 513, wherein the first attached portion 512 and the second attached portion 513 are respectively connected to two ends of the main portion 511. The first attached portion 512 is substantially parallel to the second attached portion 513. The first attached portion 512 has the first side 51a, and the second attached portion 513 has the second side 51b.

The two first conducting portions 52 are spaced from each other by a distance and are connected to the first side 51a of the connecting portion 51, wherein both the two first conducting portions 52 extend toward a first direction D1. Each of the first conducting portions 52 has a first bending section 52a and a first connecting section 52b, wherein the first bending section 52a is connected between the first side 51a of the first attached portion 512 and the first connecting section 52b. The two first connecting sections 52b extend toward the first direction D1. In the current embodiment, the two first connecting sections 52b and the connecting portion 51 are respectively located on different planes. More specifically, from the perspective of FIG. 13, the two first connecting sections 52b are located on the plane below the plane located by the connecting portion 51.

The second conducting portions 53 are spaced from each other by a distance and are connected to the second side 51b of the connecting portion 51, wherein both the two second conducting portions 53 extend toward a second direction D2 which is opposite to the first direction D1. Each of the second conducting portions 53 has a second bending section 53a and a second connecting section 53b, wherein the second bending section 53a is connected between the second side 51b of the second attached portion 513 and the second connecting section 53b. The two second connecting sections 53b extend toward the second direction D2. In the current embodiment, the two second connecting sections 53b and the connecting portion 51 are located on different planes. More specifically, from the perspective of FIG. 13, the two second connecting sections 53b are located on the plane below the plane located by the connecting portion 51.

In addition, each of the first conducting portions 52 of the battery conductive sheets 50, 50' respectively has a perforation 52c, and each of the second conducting portions 53 of the battery conductive sheets 50, 50' respectively has a perforation 53c, wherein the perforations 52c, 53c are respectively adapted to be passed through by an engaging member S6, and each of the engaging members S6 are fixed on the terminals 22 of the battery assembly.

Figure 16:
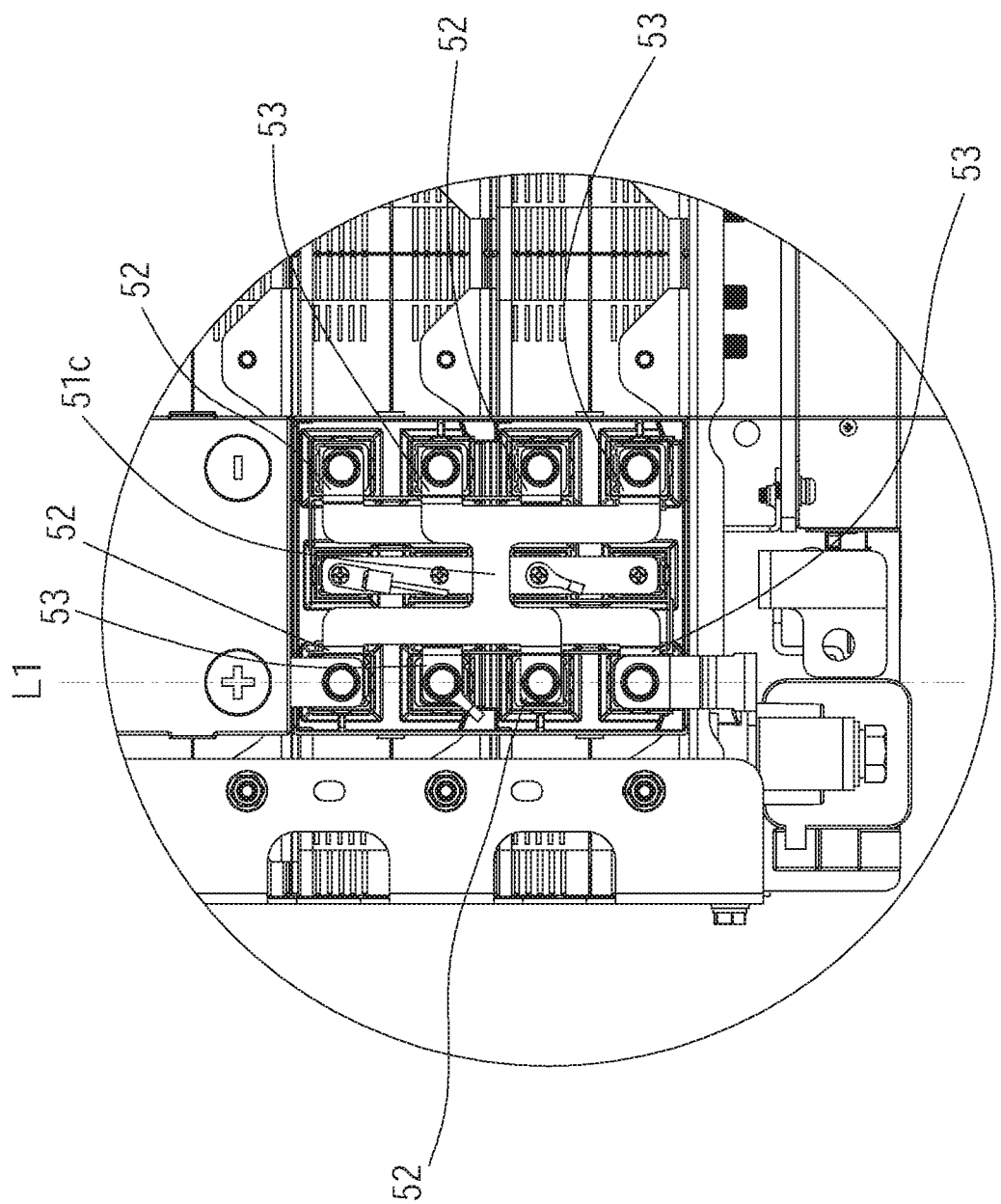
FIG. 16 is a top view, showing inside of the battery pack according to the embodiment of FIG. 1.

In the current embodiment, when the battery conductive sheets 50, 50' are to be disposed on the battery assembly, the second surface 51d of the connecting portion 51 of one of the battery conductive sheets 50, 50' (i.e. the battery conductive sheet 50') faces the second surface 51d of the connecting portion 51 of another battery conductive sheet 50. The first electrodes 24 of the battery assembly are electrically connected by one of the battery conductive sheets 50, 50' (i.e. the battery conductive sheet 50'), and the second electrodes 26 of the battery assembly are electrically connected by another battery conductive sheet 50. Preferably, the two battery conductive sheets 50, 50' have an interval left therebetween, without contacting with each other, whereby to be electrically insulated from each other. In addition, in order to prevent a short circuit of the two battery conductive sheets 50, 50', the connecting portion 51 of each of the battery conductive sheets 50, 50' could be covered or coated with an insulating coating. However, the insulating coating is not a limitation of the present invention. Moreover, as shown in FIG. 16, when the battery conductive sheets 50, 50' are disposed on the battery assembly, the projection area of the second surface 51d of one of the battery conductive sheets 50, 50' (i.e. the battery conductive sheet 50) at least partially overlaps the projection area of the second surface 51d of another battery conductive sheet 50' in a direction perpendicular to the second surface 51d. Also, the two first conducting portions 52 of one of the battery conductive sheets 50, 50' (i.e. the battery conductive sheet 50) and the two second conducting portions 53 of another battery conductive sheet 50' are substantially on the same straight line L1. Furthermore, the two first conducting portions 52 of one of the battery conductive sheets 50, 50' (i.e. the battery conductive sheet 50) and the two second conducting portions 53 of another battery conductive sheet 50' are arranged alternately.

With the aforementioned design, when the battery conductive sheets 50, 50' are disposed on the plurality of batteries 20 of the battery assembly, the two first conducting portions 52 and the two second conducting portions 53 of the battery conductive sheets 50, 50' are substantially located on the same plane. In this way, when there is a plurality of batteries 20 disposed side by side, the battery conductive sheets 50, 50' could effectively connect the batteries 20 in parallel, and the space occupied by the battery conductive sheets 50, 50' could be effectively reduced. More specifically, the battery conductive sheets 50, 50' are disposed in the space between the terminals 22 of the batteries 20, which could effectively lower the height of the battery pack 1, enabling the miniaturization of the battery pack 1.

Figure 15:
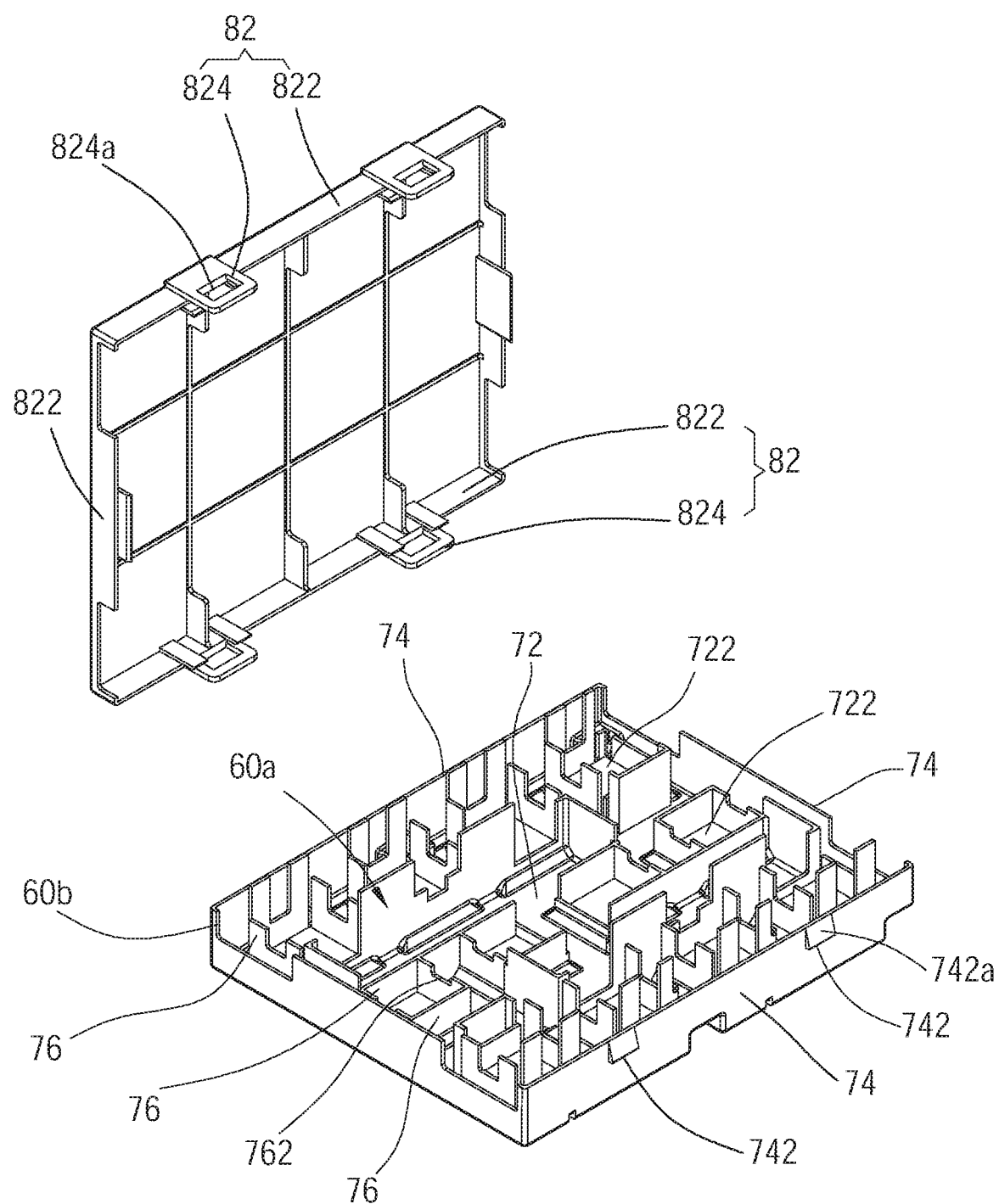
FIG. 15 is an exploded perspective view of the insulating casing of the battery pack according to the embodiment of FIG. 1.
Figure 17:
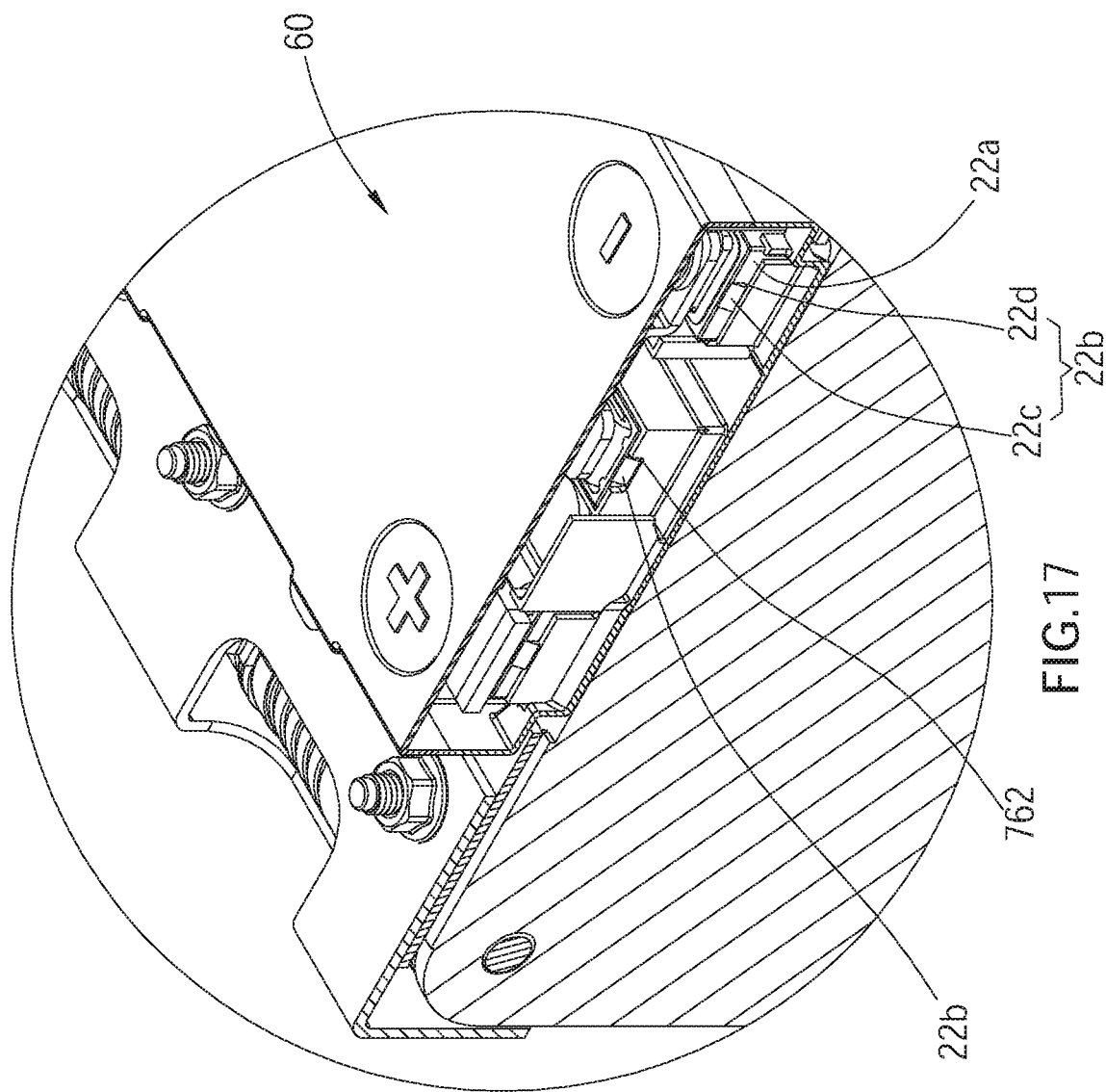
FIG. 17 is a partially sectional view, showing the engagement between the insulating casing and the terminals of the battery pack according to the embodiment of FIG. 1.
Figure 18:
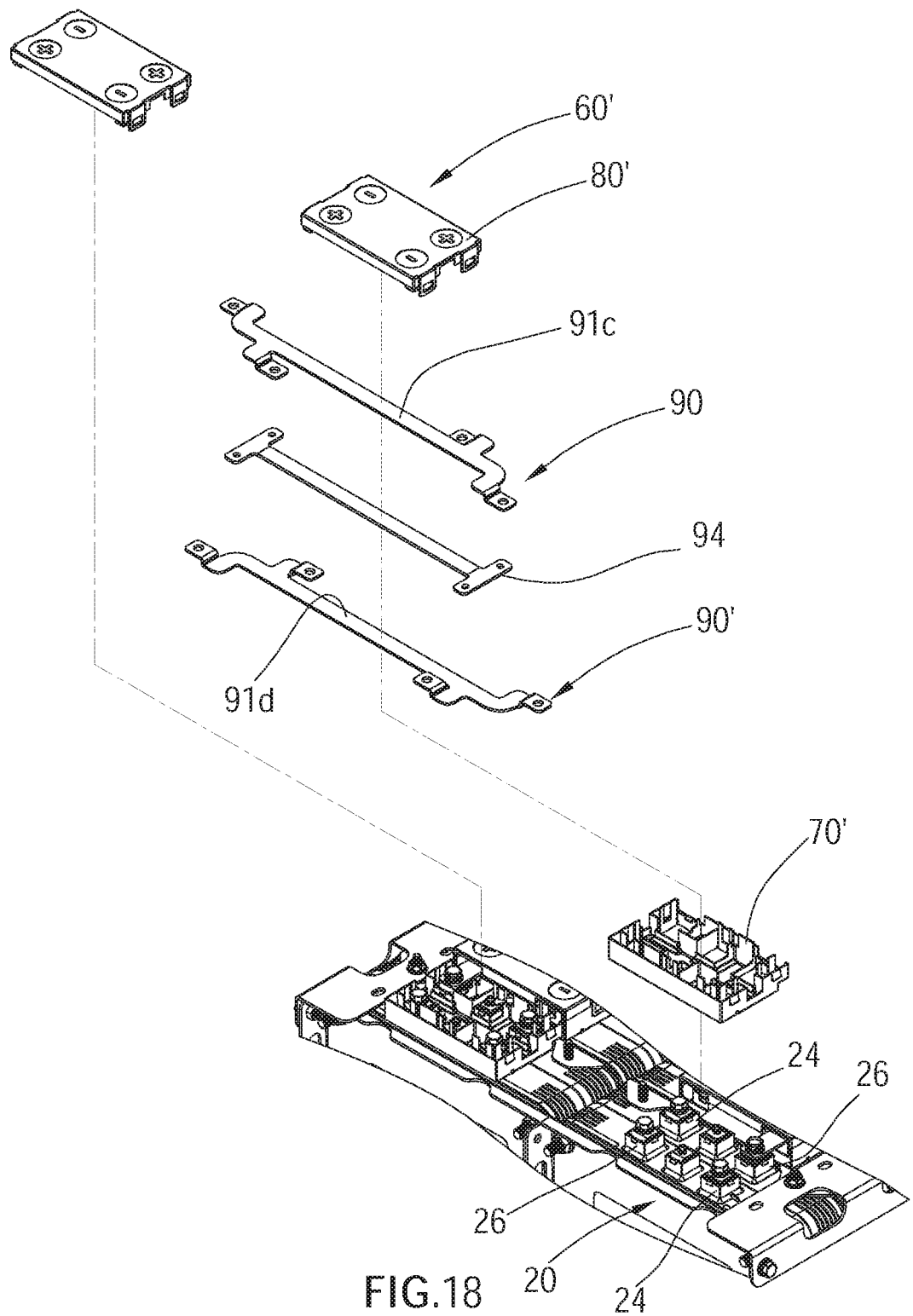
FIG. 18 is an exploded perspective view, showing another type of insulating casing and another type of battery conductive sheets of the battery pack according to another embodiment.
Figure 19:
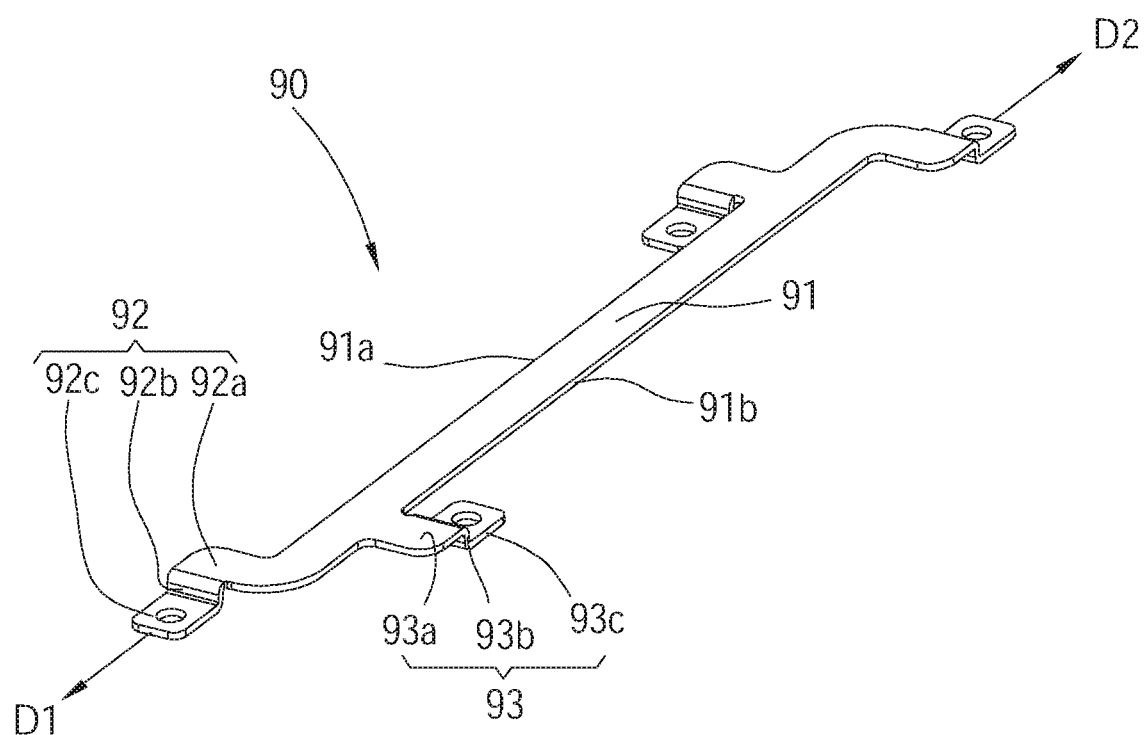
FIG. 19 is a perspective view of another type of battery conductive sheets of the battery pack according to the another embodiment.
Figure 20:
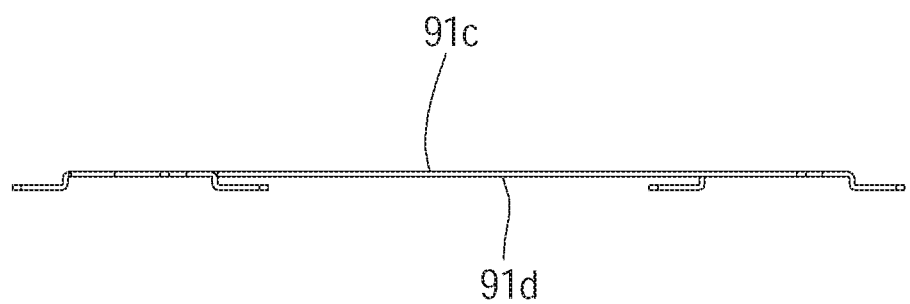
FIG. 20 is a side view of another type of battery conductive sheets of the battery pack according to the another embodiment.

As shown in FIG. 12, FIG. 15, and FIG. 17, the insulating casing 60 includes a base 70 and a top cover 80, wherein the base 70 is adapted to be engaged with the battery assembly, and includes a bottom plate 72. The bottom plate 72 has a plurality of perforations 722 passing through two surfaces of the bottom plate 72, wherein the two surfaces of the bottom plate 72 face two opposite directions. The perforations 722 of the bottom plate 72 are adapted to be passed through by the terminals 22. When the terminals 22 pass through the perforations 722 of the base 70, the battery conductive sheets 50, 50' could be disposed on the terminals 22, whereby the terminals 22 could be electrically connected to one another.

The base 70 has four lower side walls 74 which are connected to a periphery of the bottom plate 72, wherein each of two opposite lower side walls 74 has at least one first engaging portion which is either a protrusion or a recess. In the current embodiment, each of the two opposite lower side walls 74 has two first engaging portions, and the first engaging portions are protrusions 742 protruding from outside of the lower side walls 74, wherein each of the protrusions 742 has an inclined surface 742a.

The top cover 80 is detachably engaged with the base 70, and a chamber 60a communicating with the perforations 722 of the base 70 is formed between the top cover 80 and the base 70. The terminals 22 could be disposed into the chamber 60a via the perforations 722 of the base 70. The top cover 80 has four upper side walls 82 corresponding to the lower side walls 74, wherein each of two opposite upper side walls 82 has at least one second engaging portion which is either a protrusion or a recess. In the current embodiment, each of the two opposite upper side walls 82 has two second engaging portions, and the second engaging portions are recesses 824a. Each of the upper side walls 82 includes a main body 822 and at least one extending plate 824. In the current embodiment, the two opposite upper side walls 82 has two extending plates 824 extending downward from the main body 822, wherein each of the extending plates 824 has one of the recesses 824a which forms the second engaging portion. Wherein, the upper side walls 82 could be engaged with the base 70 by aligning the top cover 80 corresponding to the base 70 and moving the extending plates 824 of the upper side walls 82 downward along the inclined surface 742a of the protrusions 742 on outside of the lower side walls 74 such that each of the protrusions 742 is wedged into one of the recesses 824a of the extending plates 824, and each of the upper side walls 82 abuts against the corresponding lower side walls 74. In addition, the insulating casing 60 has a plurality of openings 60b disposed therearound to be passed through by the battery conductive sheets 50, 50'.

In the current embodiment, the bottom plate 72 includes twelve perforations 722, and the perforations 722 of the bottom plate 72 are arranged in a matrix form. A plurality of partitions 76 are disposed around the peripheral edge of each of the perforations 722 of the bottom plate 72, wherein the partitions 76 are located in the chamber 60a between the top cover 80 and the base 70 and abut against a side 22a of the corresponding terminal 22. A height of a top edge of a part of the partitions 76 is equal to or higher than that of a top edge of the side 22a of the terminals 22, whereby to form an insulating space to receive circuits such as signal wire, so as to prevent a short circuit between the terminals 22 and the battery conductive sheets 50, 50'. In addition, the side 22a of at least a part of the terminals 22 of the battery assembly has at least one positioning block 22b, wherein the positioning block 22b has an inclined surface 22c and a blocking surface 22d. The inclined surface 22c of the positioning block 22b is inclined outward from top down in a direction away from the side 22a of the terminals 22. The blocking surface 22d is connected to the bottom of the inclined surface 22c of the positioning block 22b. The blocking surface 22d of the positioning block 22b abuts against the partitions 76, whereby to fix the base 70 on the battery assembly. More specifically, at least a part of the partitions 76 has a positioning notch 762 recessed in a direction from the top edge of the corresponding partition 76 toward the bottom plate 72, wherein the blocking surface 22d of the positioning block 22b abuts against a bottom of the corresponding positioning notch 762, and an inner wall of the positioning notch 762 abuts against a lateral wall of the corresponding positioning block 22b, whereby to prevent the insulating casing 60 from moving in a lateral direction.

During the process of assembling, the base 70 of the insulating casing 60 could be disposed on the terminals 22 and fixed to the terminals 22 first, and the battery conductive sheets 50, 50' are provided then to be electrically connected to the terminals 22. In the current embodiment, as shown in FIG. 12, one of the battery conductive sheets 50, 50' (i.e., the battery conductive sheets 50') is disposed on the base 70 first with the second surface 51d thereof facing upward, and the first conducting portions 52 and the second conducting portions 53 of the battery conductive sheets 50' are electrically connected to the second electrodes 26 of the battery assembly and are fixed by the engaging members S6. After that, the conductive sheet 29 is disposed to be electrically connected to the third electrodes 28 of the battery assembly and is fixed by an engaging member, and then the another battery conductive sheet 50 is provided on the base with the first surface 51c thereof facing upward (i.e., the second surface 51d of the another battery conductive sheet 50 faces downward), and the first conducting portions 52 and the second conducting portions 53 of the battery conductive sheets 50 are electrically connected to the first electrodes 24 of the battery assembly and are fixed by the engaging members S6. Finally, the base 70 is covered with the top cover 80.

In an embodiment, as shown in FIG. 18 to FIG. 21, the battery pack 1 further includes another type of insulating casing 60' and another type of battery conductive sheets 90, 90', wherein the insulating casing 60' includes a base 70' and a top cover 80'. The insulating casing 60' has almost the same structures as said insulating casing 60, except that the insulating casing 60' could receive fewer terminals than the insulating casing 60 did. In addition, a conductive sheet 94 is disposed between the battery conductive sheets 90, 90' which are adapted to electrically connect the third electrode of the two rows of the batteries 20.

The battery conductive sheets 90, 90' are arranged in pairs and are disposed on the batteries 20, whereby the first electrodes 24 of the battery assembly could be electrically connected to one another, and the second electrodes 26 of the battery assembly could be electrically connected to one another. The insulating casing 60' is adapted to insulate the terminals 22 from the battery conductive sheets 90, 90'.

For ease of explanation, we will only describe the details of one of the battery conductive sheets 90, 90' in the following paragraphs, for the battery conductive sheets 90, 90' have substantially the same configurations. The battery conductive sheet 90 is made of conductive material, such as gold, silver, copper, aluminum, etc. In the current embodiment, the battery conductive sheet 90 is made of copper. However, the material of the battery conductive sheet is not a limitation of the present invention. The battery conductive sheet 90 includes a connecting portion 91, two first conducting portions 92, and two second conducting portions 93. The connecting portion 91 has a first side 91a, a second side 91b, a first surface 91c, and a second surface 91d, wherein the first side Ma and the second side 51b face opposite directions, and the first surface 51c and the second surface 51d face opposite directions.

The two first conducting portions 92 are spaced from each other by a distance and are connected to the first side 91a of the connecting portion 91, wherein both the two first conducting portions 92 extend toward a first direction D1. Each of the first conducting portions 92 has a first extension section 92a, a first bending section 92b, and a first connecting section 92c, wherein the first extension section 92a is connected to the first side 91a. A side of the first bending section 92b is connected to a side of the first extension section 92a facing the first direction D1, and another side of the first bending section 92b is connected to the first connecting section 92c. The two first connecting sections 92c extend toward the first direction D1. In the current embodiment, the two first extension sections 92a and the connecting portion 91 are substantially located on the same plane. The two first connecting sections 92c are substantially located on the same plane, wherein the two first connecting sections 92c and the connecting portion 91 are respectively located on different planes. More specifically, from the perspective of FIG. 19, the two first connecting sections 92c are located on the plane below the plane located by the connecting portion 91.

The second conducting portions 93 are spaced from each other by a distance and are connected to the second side 91b of the connecting portion 91, wherein both the two second conducting portions 93 extend toward a second direction D2 which is opposite to the first direction D1. Each of the second conducting portions 93 has a second extension section 93a, a second bending section 93b, and a second connecting section 93c, wherein the second extension section 93a is connected to the second side 91b. A side of the second bending section 93b is connected to a side of the second extension section 93a facing the second direction D2, and another side of the second bending section 93b is connected to the second connecting section 93c. The two second connecting sections 93c extend toward the second direction D2. In the current embodiment, the two second extension sections 93a and the connecting portion 91 are substantially located on the same plane. The two second connecting sections 93c are substantially located on the same plane, wherein the two second connecting sections 93c and the connecting portion 91 are respectively located on different planes. More specifically, from the perspective of FIG. 19, the two second connecting sections 93c are located on the plane below the plane located by the connecting portion 91. In addition, the two second connecting sections 93c and the two first connecting sections 92c are substantially located on the same plane. The engagement between the battery conductive sheets 90, 90' and the terminals of the batteries 20 are similar to that of said embodiment, thus we are not going to describe it in details herein.

Figure 21:
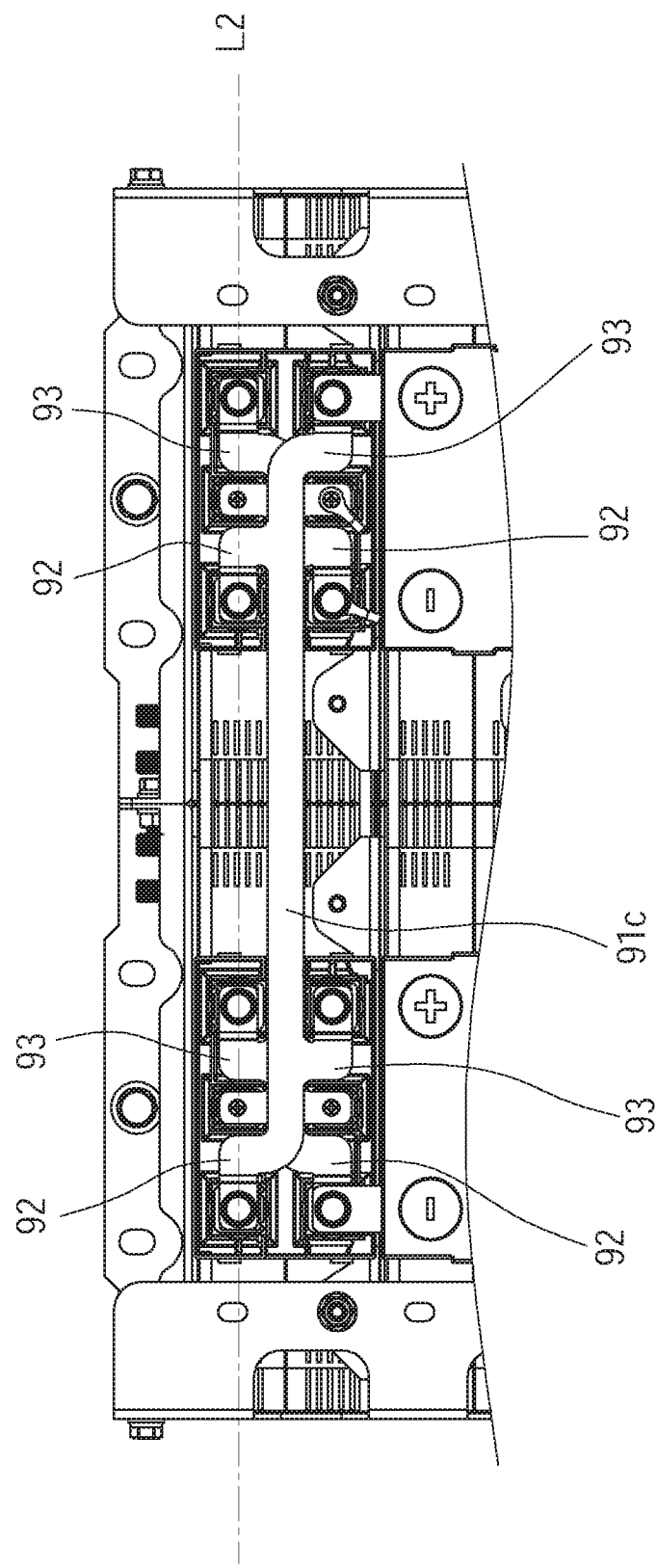
FIG. 21 is a partial top view, showing inside of the battery pack according to the another embodiment.

It is worth mentioning that, in the current embodiment, when the battery conductive sheets 90, 90' are to be disposed on the battery assembly formed by the two rows of batteries 20, the second surface 91d of the connecting portion 91 of one of the battery conductive sheets 90, 90' (i.e. the battery conductive sheet 90') faces the second surface 91d of the connecting portion 91 of another battery conductive sheet 90. The second electrodes 26 of the battery assembly are electrically connected by one of the battery conductive sheets 90, 90' (i.e. the battery conductive sheet 90'), and the first electrodes 24 of the battery assembly are electrically connected by another battery conductive sheet 90. Preferably, the two battery conductive sheets 90, 90' have an interval left therebetween, without contacting with each other, whereby to be electrically insulated from each other. In addition, in order to prevent a short circuit of the two battery conductive sheets 90, 90', the connecting portion 91 of each of the battery conductive sheets 90, 90' could be covered or coated with an insulating coating. However, the insulating coating is not a limitation of the present invention. Moreover, as shown in FIG. 21, when the battery conductive sheets 90, 90' are disposed on the battery assembly, the projection area of the second surface 91d of one of the battery conductive sheets 90, 90' (i.e. the battery conductive sheet 90) at least partially overlaps the projection area of the second surface 91d of another battery conductive sheet 90' in a direction perpendicular to the second surface 91d. Also, the two first conducting portions 92 of one of the battery conductive sheets 90, 90' (i.e. the battery conductive sheet 90) and the two second conducting portions 93 of another battery conductive sheet 90' are substantially on the same straight line L2. Furthermore, the two first conducting portions 92 of one of the battery conductive sheets 90, 90' (i.e. the battery conductive sheet 90) and the two second conducting portions 93 of another battery conductive sheet 90' are arranged alternately.

With the aforementioned design, when the battery conductive sheets 90, 90' are disposed on the plurality of batteries 20 of the battery assembly, the two first conducting portions 92 and the two second conducting portions 93 of the battery conductive sheets 90, 90' are substantially located on the same plane. In this way, when there is a plurality of batteries 20 disposed side by side, the battery conductive sheets 90, 90' could effectively connect the batteries 20 in parallel, and the space occupied by the battery conductive sheets 90, 90' could be effectively reduced. More specifically, the battery conductive sheets 90, 90' are disposed in the space between the terminals 22 of the batteries 20, which could effectively lower the height of the battery assembly, enabling the miniaturization of the battery pack 1.

In conclusion, the battery pack 1 of the present invention has the advantages of high assembly reliability, and could be modular manufactured, and could be applied to electric vehicle and energy storage system structure. In addition, the number of the batteries disposed in the battery pack 1 could be freely adjusted to meet various requirements, whereby the battery pack 1 could be widely applied to the electric vehicle and energy storage system structure.

It must be pointed out that the embodiments described above are only some preferred embodiments of the present invention. All equivalent structures which employ the concepts disclosed in this specification and the appended claims should fall within the scope of the present invention.

What is claimed is:

1. A battery pack, comprising:
a case comprising a first body, a second body, and a connecting frame, wherein the first body has a first opening; the second body has a second opening which could match with the first opening, and a chamber is formed between the first body and the second body; the connecting frame is connected to the second body, and has a first connecting shaft and a second connecting shaft, wherein the first connecting shaft is adapted to be connected to the first body, and the second connecting shaft is adapted to be connected to a mounting position; and
a plurality of batteries disposed side by side in the chamber;
wherein the first connecting shaft has an abutting surface, which does not face the second connecting shaft, and a side surface connected to the abutting surface; a peripheral edge of the first body is adapted to abut against the abutting surface; a closed peripheral wall is formed on the peripheral edge of the first body, wherein the closed peripheral wall surrounds the side surface.

2. The battery pack of claim 1, wherein the connecting frame is disposed around an outer contour of the second body.

3. The battery pack of claim 1, wherein the connecting frame comprises a connecting plate which is adapted to be engaged with the second body; the first connecting shaft and the second connecting shaft are respectively connected to two lateral sides of the connecting plate.

4. The battery pack of claim 3, wherein the first connecting shaft and the second connecting shaft extend in the same direction from the two lateral sides of the connecting plate.

5. The battery pack of claim 1, wherein the first connecting shaft and the second connecting shaft are integrally formed as a monolithic unit.

6. The battery pack of claim 1, wherein a rubber strip is disposed between the first connecting shaft and a peripheral edge of the first opening of the first body.

7. The battery pack of claim 6, wherein the rubber strip has a plurality of perforations; an O-ring which is made of a hard material is provided within each of the perforations, and two ends of the O-ring respectively abut against the first body and the first connecting shaft.

8. The battery pack of claim 1, wherein the batteries are arranged along a predetermined axial direction; the battery pack further comprises a battery holder; the battery holder comprises a bottom frame, a first lateral frame, and a second lateral frame; the first lateral frame comprises two side frames which are adjacent to each other and are disposed on the bottom frame; each of the side frames comprises a main plate, a first side bar, and a second side bar, wherein each of the main plates has a first blocking surface; the two side frames are respectively connected to two opposite sides of the main plate; each of the first side bars has a first perforation, and each of the second side bars has a second perforation corresponding to the first perforation; each of the first perforations of each of the first side bars has a first width in the predetermined axial direction, and each of the second perforations of each of the second side bars has a second width in the predetermined axial direction, wherein the first width is greater than the second width; the first side bar of one of the side frames is adjacent to the second side bar of another side frame, and an engaging member passes through the first perforations of the first side bar and the second perforations of the second side bar which are adjacent to each other to fix the two side frames; the second lateral frame is engaged with the bottom frame, and has two second blocking surfaces, wherein each of the second blocking surfaces respectively faces one of the first blocking surfaces of the main plate; the batteries are disposed between each of the first blocking surfaces and the corresponding second blocking surface.

9. The battery pack of claim 8, wherein each of the second perforations is a circular hole, and each of the first perforations is long in shape, wherein a longitudinal axis direction of each of the first perforations is parallel to the predetermined axial direction.

10. The battery pack of claim 1, wherein each of the batteries has a plurality of terminals; the battery pack further comprises a plurality of insulating casings disposed on the batteries; each of the insulating casings comprises a base and a top cover, wherein the base is adapted to be engaged with the batteries, and comprises a bottom plate; the bottom plate has a plurality of perforations passing through two surfaces of the bottom plate, wherein the two surfaces of the bottom plate face two opposite direction; the perforations of the bottom plate are adapted to be passed through by the terminals; the top cover is detachably engaged with the base, and a chamber communicating with the perforations of the base is formed between the top cover and the base.

11. The battery pack of claim 10, wherein a plurality of partitions are disposed around a peripheral edge of each of the perforations of the bottom plate, wherein the partitions are located in the chamber between the top cover and the base, and surround each of the perforations of the bottom plate.

12. The battery pack of claim 11, wherein at least a part of the terminals has at least one positioning block; the at least one positioning block abuts against at least a part of the partitions, whereby to fix the base to the batteries.

13. The battery pack of claim 12, wherein at least a part of the partitions have positioning notches, each of which is recessed in a direction from a top edge of the corresponding partition toward the bottom plate; the at least one positioning block respectively abut against the corresponding positioning notch.

14. The battery pack of claim 1, wherein each of the batteries has a first electrode and a second electrode; the first electrodes and the second electrodes are alternatively arranged; the battery pack further comprises a plurality of battery conductive sheets, wherein each of the battery conductive sheets comprises a connecting portion, two first conducting portions, and two second conducting portions; the connecting portion has a first side, a second side, a first surface, and a second surface, wherein the first side and the second side face opposite directions, and the first surface and the second surface face opposite directions; the second surface of the connecting portion of one of the battery conductive sheets faces the second surface of the connecting portion of another battery conductive sheet; the two first conducting portions are spaced from each other by a distance and are connected to the first side of the connecting portion, wherein both the two first conducting portions extend along a first direction; the two second conducting portions are spaced from each other by a distance and are connected to the second side of the connecting portion, wherein both the two second conducting portions extend along a second direction which is opposite to the first direction.

15. The battery pack of claim 14, wherein each of the first conducting portions of each of the battery conductive sheets has a first extension section, a first bending section, and a first connecting section; the first extension section is connected to the first side; a side of the first bending section is connected to a side of the first extension section facing the first direction, and another side of the first bending section is connected to the first connecting section; each of the second conducting portions of each of the battery conductive sheets has a second extension section, a second bending section, and a second connecting section, wherein the second extension section is connected to the second side; a side of the second bending section is connected to a side of the second extension section facing the second direction, and another side of the second bending section is connected to the second connecting section.

16. The battery pack of claim 14, wherein the connecting portion of each of the battery conductive sheets includes a main portion, a first attached portion, and a second attached portion; the first attached portion and the second attached portion are respectively connected to two ends of the main portion; the first attached portion is substantially parallel to the second attached portion; the first attached portion has the first side, and the second attached portion has the second side.

17. The battery pack of claim 16, wherein each of the first conducting portions of each of the battery conductive sheets has a first bending section and a first connecting section; the first bending section is connected between the first side of the first attached portion and the first connecting section; each of the second conducting portions of each of the battery conductive sheets has a second bending section and a second connecting section, wherein the second bending section is connected between the second side of the second attached portion and the second connecting section.

18. The battery pack of claim 1, wherein the batteries are arranged along a predetermined axial direction; the battery pack further comprises a monitoring device electrically connected to the batteries; the monitoring device is located on a side of the batteries in the predetermined axial direction.

19. The battery pack of claim 18, wherein the monitoring device is located within a projection area of the batteries along the predetermined axial direction.

* * * * *